(12) United States Patent
Sissom

(10) Patent No.: US 11,619,827 B2
(45) Date of Patent: Apr. 4, 2023

(54) POLARIZING BEAM SPLITTER WITH LOW LIGHT LEAKAGE

(71) Applicant: Magic Leap, Inc., Plantation, FL (US)

(72) Inventor: Bradley Jay Sissom, Boulder, CO (US)

(73) Assignee: Magic Leap, Inc., Plantation, FL (US)

( * ) Notice: Subject to any disclaimer, the term of this patent is extended or adjusted under 35 U.S.C. 154(b) by 438 days.

(21) Appl. No.: 16/401,040

(22) Filed: May 1, 2019

(65) Prior Publication Data

US 2019/0258073 A1    Aug. 22, 2019

Related U.S. Application Data

(63) Continuation of application No. 15/442,461, filed on Feb. 24, 2017, now Pat. No. 10,302,957.

(60) Provisional application No. 62/307,263, filed on Mar. 11, 2016, provisional application No. 62/299,601, filed on Feb. 25, 2016, provisional application No. 62/299,547, filed on Feb. 24, 2016.

(51) Int. Cl.
*G02B 27/28* (2006.01)
*G02B 27/01* (2006.01)
*H04N 9/31* (2006.01)
*F21V 8/00* (2006.01)

(52) U.S. Cl.
CPC ......... *G02B 27/283* (2013.01); *G02B 6/0076* (2013.01); *G02B 27/0101* (2013.01); *G02B 27/0172* (2013.01); *H04N 9/3167* (2013.01); *G02B 2027/0125* (2013.01)

(58) Field of Classification Search
CPC .... G02B 27/28; G02B 27/283; G02B 27/286; G02B 27/0101; G02B 27/0172; G02B 6/0076; G02B 6/2706; G02B 2027/0125; G02B 2027/013; H04N 9/3167
USPC .................................................. 359/485.04
See application file for complete search history.

(56) References Cited

U.S. PATENT DOCUMENTS 5,900,976 A    5/1999   Handschy et al.
6,042,234 A    3/2000   Itoh
6,132,047 A    10/2000  Itoh
(Continued)

FOREIGN PATENT DOCUMENTS

CN    1228544 A    9/1999
CN    105122116 A  12/2005
(Continued)

OTHER PUBLICATIONS

European Extended Search Report, re EP Application No. 17757379. 7, dated Oct. 1, 2019.
(Continued)

*Primary Examiner* — Marin Pichler
(74) *Attorney, Agent, or Firm* — Knobbe, Martens, Olson & Bear, LLP

(57) ABSTRACT

In some embodiments, a polarizing beam splitter is provided. The beam splitter may comprise an optically transmissive spacer having first and second opposing faces, with a first polarizer on the first opposing face and a second polarizer on the second opposing face. The optically transmissive spacer may separate first and second triangular prisms of a cube-type beam splitter, with the first polarizer between the first triangular prism and the first opposing face of the spacer, and the second polarizer between the second triangular prism and the second opposing face of the spacer.

19 Claims, 20 Drawing Sheets

A

B

(56) References Cited

U.S. PATENT DOCUMENTS

| | | |
|---|---|---|
| 6,486,997 B1 | 11/2002 | Bruzzone et al. |
| 6,610,356 B2 | 8/2003 | Kausch et al. |
| 6,850,221 B1 | 2/2005 | Tickle |
| 6,863,896 B1 | 3/2005 | O'Hagan et al. |
| D514,570 S | 2/2006 | Ohta |
| 7,360,899 B2 | 4/2008 | McGuire et al. |
| 8,369,014 B2 | 2/2013 | Abdulhalim |
| 8,488,246 B2 | 7/2013 | Border et al. |
| 8,817,371 B1 | 8/2014 | Boothroyd et al. |
| 8,950,867 B2 | 2/2015 | Macnamara |
| 9,081,426 B2 | 7/2015 | Armstrong |
| 9,215,293 B2 | 12/2015 | Miller |
| D752,529 S | 3/2016 | Loretan et al. |
| 9,310,559 B2 | 4/2016 | Macnamara |
| 9,348,143 B2 | 5/2016 | Gao et al. |
| D758,367 S | 6/2016 | Natsume |
| D759,657 S | 7/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt et al. |
| D805,734 S | 12/2017 | Fisher et al. |
| 9,851,563 B2 | 12/2017 | Gao et al. |
| 9,857,591 B2 | 1/2018 | Welch et al. |
| 9,874,749 B2 | 1/2018 | Bradski |
| 9,958,699 B2 | 5/2018 | Watson et al. |
| 10,302,957 B2 | 5/2019 | Sissom et al. |
| 2002/0017736 A1 | 2/2002 | Kausch et al. |
| 2002/0085281 A1 | 7/2002 | Dubin et al. |
| 2004/0130680 A1 | 7/2004 | Zhou et al. |
| 2004/0227994 A1 | 11/2004 | Ma |
| 2004/0234222 A1 | 11/2004 | Kuroda et al. |
| 2004/0247327 A1 | 12/2004 | Kamali et al. |
| 2004/0254438 A1 | 12/2004 | Chuck et al. |
| 2005/0002097 A1 | 1/2005 | Boyd et al. |
| 2005/0168697 A1 | 8/2005 | Bruzzone et al. |
| 2006/0028436 A1 | 2/2006 | Armstrong |
| 2007/0081123 A1 | 4/2007 | Lewis |
| 2008/0013051 A1 | 1/2008 | Glinski et al. |
| 2008/0151371 A1* | 6/2008 | Weber .................. G02B 5/3041 359/487.02 |
| 2009/0128903 A1 | 5/2009 | Sano |
| 2010/0110383 A1 | 5/2010 | Tang |
| 2011/0182469 A1 | 7/2011 | Ji et al. |
| 2011/0205495 A1 | 8/2011 | Coleman et al. |
| 2011/0242661 A1 | 10/2011 | Simmonds |
| 2012/0127062 A1 | 5/2012 | Bar-Zeev et al. |
| 2012/0147280 A1 | 6/2012 | Osterman et al. |
| 2012/0162549 A1 | 6/2012 | Gao et al. |
| 2012/0212400 A1 | 8/2012 | Border et al. |
| 2012/0249969 A1 | 10/2012 | Ishimatsu |
| 2012/0249970 A1 | 10/2012 | Ishimatsu |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2013/0250415 A1 | 9/2013 | Gupta |
| 2014/0071539 A1 | 3/2014 | Gao |
| 2014/0176818 A1 | 6/2014 | Watson et al. |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2014/0380249 A1 | 12/2014 | Fleizach |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0219896 A1 | 8/2015 | Ouderkirk et al. |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0302652 A1 | 10/2015 | Miller et al. |
| 2015/0309263 A2 | 10/2015 | Abovitz et al. |
| 2015/0319342 A1 | 11/2015 | Schowengerdt |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0116739 A1 | 4/2016 | TeKolste et al. |
| 2017/0068029 A1* | 3/2017 | Yun ..................... G02B 5/3083 |
| 2017/0242264 A1 | 8/2017 | Sissom |
| 2018/0106951 A1 | 4/2018 | Oohira |
| 2018/0217394 A1 | 8/2018 | Watson et al. |

FOREIGN PATENT DOCUMENTS

| | | | |
|---|---|---|---|
| CN | 1791815 A | 6/2006 | |
| CN | 101490606 | 7/2009 | |
| CN | 101490606 A | 7/2009 | |
| CN | 103890639 A | 6/2014 | |
| CN | 104185809 A | 12/2014 | |
| CN | 104781723 A | 7/2015 | |
| CN | 106154569 | 11/2016 | |
| CN | 106154569 A | 11/2016 | |
| CN | 106842397 | 6/2017 | |
| CN | 106842397 A | 6/2017 | |
| JP | 2002-509283 A | 3/2002 | |
| JP | 2003-523529 A | 8/2003 | |
| JP | 2011-024261 | 2/2011 | |
| JP | 2011-024261 A | 2/2011 | |
| JP | 2012-203329 | 10/2012 | |
| JP | 2012-203329 A | 10/2012 | |
| JP | 2012-208202 A | 10/2012 | |
| JP | 2012-211983 | 11/2012 | |
| JP | 2012-211983 A | 11/2012 | |
| JP | 2013-521576 A | 6/2013 | |
| JP | 2013-145402 A | 7/2013 | |
| JP | 2014-139664 A | 7/2014 | |
| JP | 2015-048286 A | 3/2015 | |
| JP | 2015-049439 A | 3/2015 | |
| JP | WO 2015/159726 | 10/2015 | |
| JP | 6863896 B2 | 4/2021 | |
| WO | WO 1999/36814 | 7/1999 | |
| WO | WO 2001/55783 | 8/2001 | |
| WO | WO 2013/062932 | 5/2013 | |
| WO | WO 2013/123461 | 8/2013 | |
| WO | WO 2014/031326 | 2/2014 | |
| WO | WO 2014/031961 | 2/2014 | |
| WO | WO 2014/099479 | 6/2014 | |
| WO | WO 2014/128507 | 8/2014 | |
| WO | WO 2015/159726 | 10/2015 | |
| WO | WO-2015159726 A1 * | 10/2015 | ............... G02B 5/04 |
| WO | WO 2017/147527 | 8/2017 | |

OTHER PUBLICATIONS

U.S. Appl. No. 14/555,585, filed Nov. 27, 2014, Schowengerdt.
U.S. Appl. No. 14/212,961, filed Mar. 4, 2014, Schowengerdt et al.
U.S. Appl. No. 14/331,218, filed Jul. 14, 2014, Abovitz et al.
U.S. Appl. No. 62/012,273, filed Jun. 14, 2014, Bradski.
International Search Report and Written Opinion for PCT Application No. PCT/US2017/019510, dated May 5, 2017.
International Preliminary Report on Patentability for PCT Application No. PCT/US2017/019510, dated Aug. 28, 2018.
Farabet, C. et al., "Hardware Accelerated Convolutional Neural Networks for Synthetic Vision Systems", Proceedings of the 2010 IEEE International Symposium (May 30-Jun. 2, 2010) Circuits and Systems (ISCAS), pp. 257-260.
ARToolKit: https://web.archive.org/web/20051013062315/http://www.hiti.washington.edu:80/artoolkit/documentation/hardware.htm, archived Oct. 13, 2005.
Azuma, "a Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

(56) References Cited

OTHER PUBLICATIONS

Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

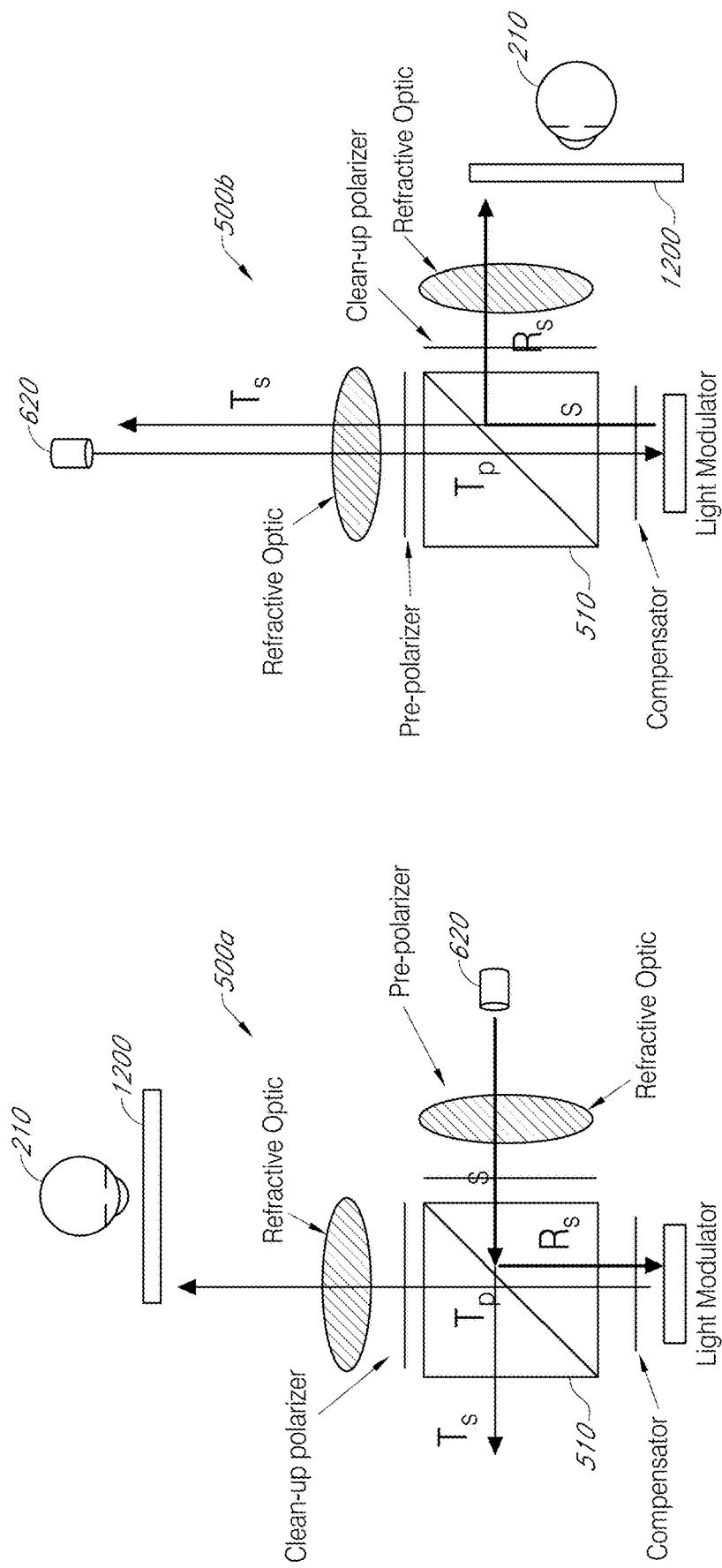

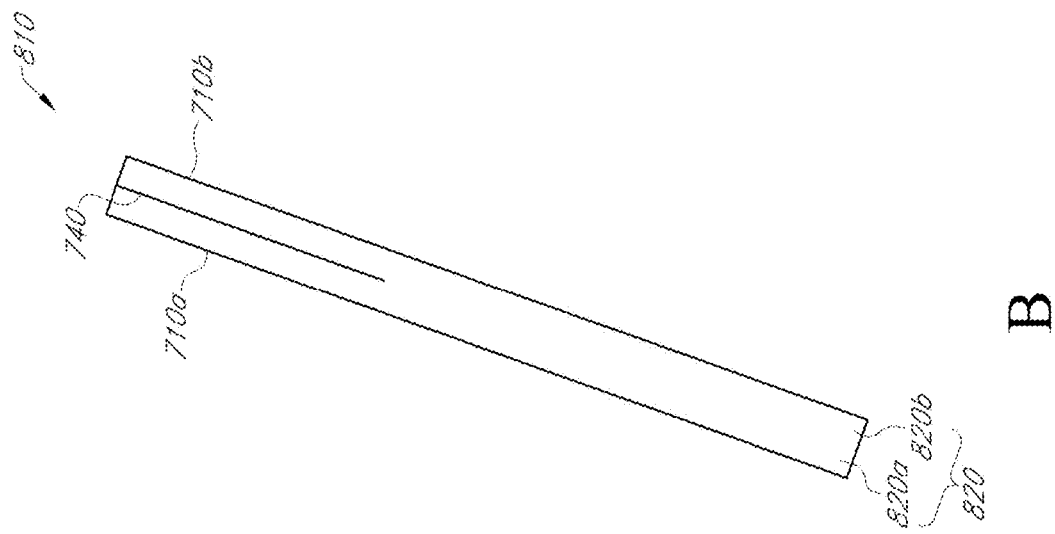
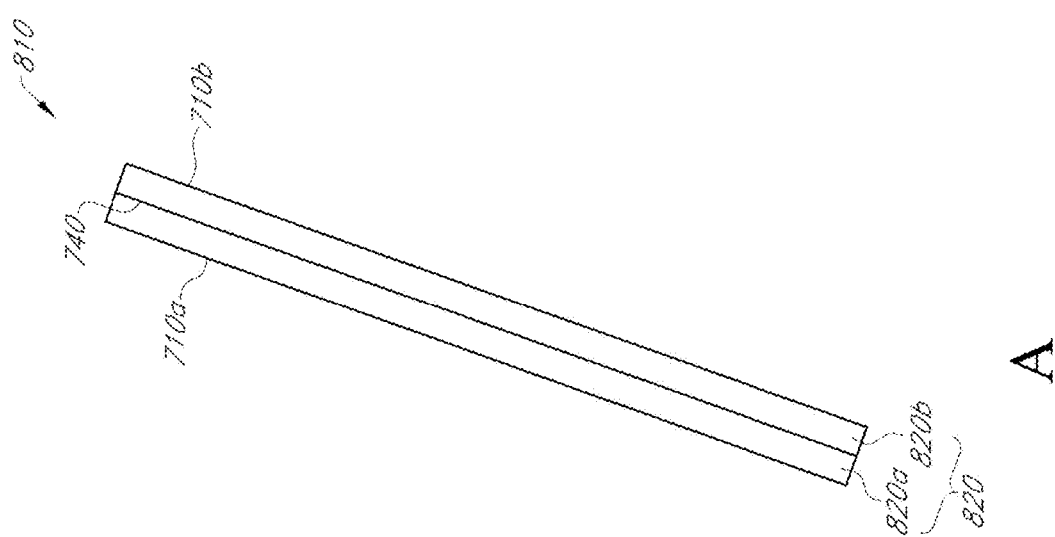
FIG. 19

POLARIZING BEAM SPLITTER WITH LOW LIGHT LEAKAGE

CROSS-REFERENCE TO RELATED APPLICATIONS

This application is a continuation of U.S. application Ser. No. 15/442,461, filed Feb. 24, 2017, entitled "POLARIZING BEAM SPLITTER WITH LOW LIGHT LEAKAGE", which claims the benefit of priority under 35 U.S.C. § 119(e) of each of the following: U.S. Provisional Application No. 62/299,547, filed on Feb. 24, 2016, entitled "POLARIZING BEAM SPLITTER WITH LOW LIGHT LEAKAGE"; U.S. Provisional Application No. 62/299,601, filed on Feb. 25, 2016, entitled "POLARIZING BEAM SPLITTER WITH LOW LIGHT LEAKAGE"; U.S. Provisional Application No. 62/307,263, filed on Mar. 11, 2016, entitled "POLARIZING BEAM SPLITTER WITH LOW LIGHT LEAKAGE." The disclosures of these priority documents are hereby incorporated by reference in their entireties.

This application also incorporates by reference the entirety of each of the following patent applications: U.S. application Ser. No. 14/555,585 filed on Nov. 27, 2014; U.S. application Ser. No. 14/690,401 filed on Apr. 18, 2015; U.S. application Ser. No. 14/212,961 filed on Mar. 14, 2014; and U.S. application Ser. No. 14/331,218 filed on Jul. 14, 2014.

BACKGROUND

Field

The present disclosure relates to optical devices and, more particularly, to polarizing beam splitters for display devices.

Description of the Related Art

Polarizing beam splitters may be used in display systems to direct polarized light to light modulators and then to direct this light to a viewer. There is a continuing demand to reduce the sizes of display systems generally and, as a result, there is also a demand to reduce the sizes of the constituent parts of the display systems, including constituent parts utilizing polarizing beam splitters.

SUMMARY

In some embodiments, a polarizing beam splitter is provided. The Beam splitter comprises an optically transmissive spacer having first and second opposing faces, a first polarizer on the first opposing face, and a second polarizer on the second opposing face. In some embodiments, the optically transmissive spacer is a plate. In some other embodiments, the optically transmissive spacer may separate first and second triangular prisms, with the first polarizer between the first triangular prism and the first opposing face of the spacer, and with the second polarizer between the second triangular prism and the second opposing face of the spacer.

In yet other embodiments, a display system is provided. The display system comprises a polarizing beam splitter. The beam splitter comprises an optically transmissive spacer having first and second opposing faces, a first polarizer on the first opposing face, and a second polarizer on the second opposing face. The display system also comprises a light source; a spatial light modulator; and a reflector. The polarizing beam splitter is configured to reflect light from the light source towards the reflector, transmit light from the reflector to the spatial light modulator, and reflect light from the spatial light modulator such that the light propagates away from the polarizing beam splitter and the light source.

BRIEF DESCRIPTION OF THE DRAWINGS

FIGS. 13A-13B illustrate schematic plan views of PBS display assemblies having light leakage that does not reach the viewer.

FIG. 19 illustrates a plate-type beam splitter containing an intervening reflection-preventing polarizer.

The drawings are provided to illustrate example embodiments and are not intended to limit the scope of the disclosure and are not necessarily drawn to scale. Like reference numerals refer to like parts throughout.

DETAILED DESCRIPTION

Figures 10A, 10B:
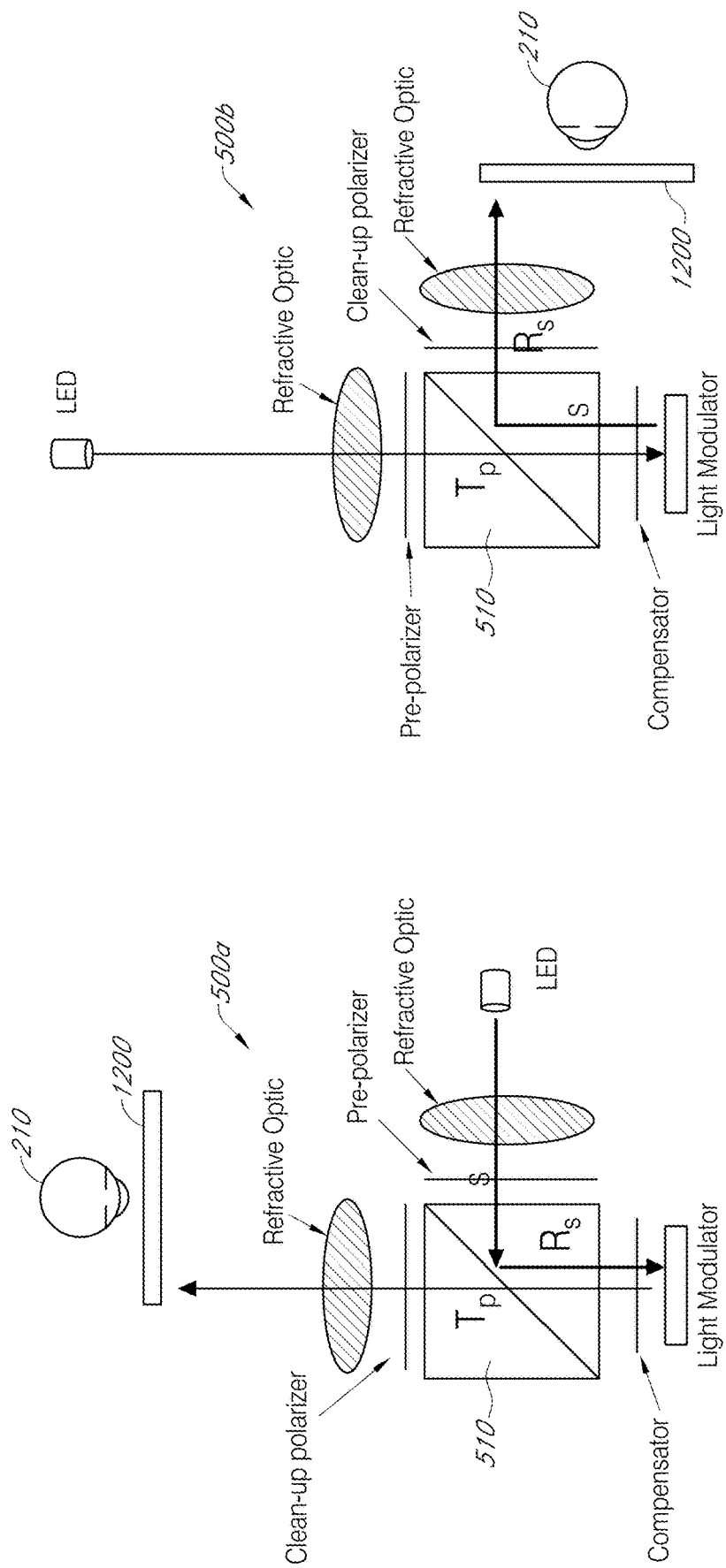
FIGS. 10A and 10B illustrate schematic plan views of polarizing beam splitter (PBS) display assemblies comprising a polarizing beam splitter, a light source, and a light modulator.

In some display devices, polarizing beam splitters may be used to direct light from a light source to a light modulator, which may then modulate and reflect the light back through the polarizing beam splitter to a viewer. It will be appreciated that the modulation of the light by the light modulator may be said to encode the light with image information, which is then propagated to the viewer. FIGS. 10A and 10B illustrate schematic plan views of polarizing beam splitter (PBS) display assemblies 500a and 500b that have been developed to provide image information to a viewer via a waveguide assembly 1200. The display assemblies 500a and 500b comprise a polarizing beam splitter (PBS) 510, a light source (e.g., an light emitting diode, or LED), and a light modulator. As illustrated, a pre-polarizer may be provided between the PBS 510 and the light source. The pre-polarizer may be configured to selectively transmit s-polarized light to the PBS 510, which then reflects the s-polarized light to the light modulator, e.g., a spatial light modulator, which both modulates the light to form an image and reflects the modulated light through the PBS 510 to an incoupling optical element of the waveguide assembly 1200 that relays the light to a viewer's eye 210. It will be appreciated that the light modulator converts the received s-polarized light to p-polarized light, and the PBS 510 selectively reflects s-polarized light ($R_s$) and transmits p-polarized light ($T_p$). A cleanup polarizer may be provided between the PBS 510 and the waveguide assembly 1200 to remove unintentionally transmitted light.

FIG. 10B shows an alternative arrangement in which the pre-polarizer transmits p-polarized light to the PBS 510. The p-polarized light travels through the PBS 510, is reflected and modulated by the light modulator back to the PBS 510 as s-polarized light. The PBS 510 then reflects the s-polarized light towards the waveguide assembly 1200.

As a convention herein with reference to rays of light illustrated in the figures, the letters s and p indicate light with a unique polarization (e.g., light having an s-polarization state and light having a p-polarization state, respectively), and the letters T and R indicate transmitted and reflected light, respectively. Thus, $T_p$ indicates transmitted light having a p-polarization state and $R_s$ indicates light having an s-polarization state.

It will be appreciated that, due to optical constraints, the light source may need to be spaced a certain distance from the PBS 510. Undesirably, this can increase the volume occupied by the PBS display assemblies 500a, 500b, where the distance is long.

Figure 11:
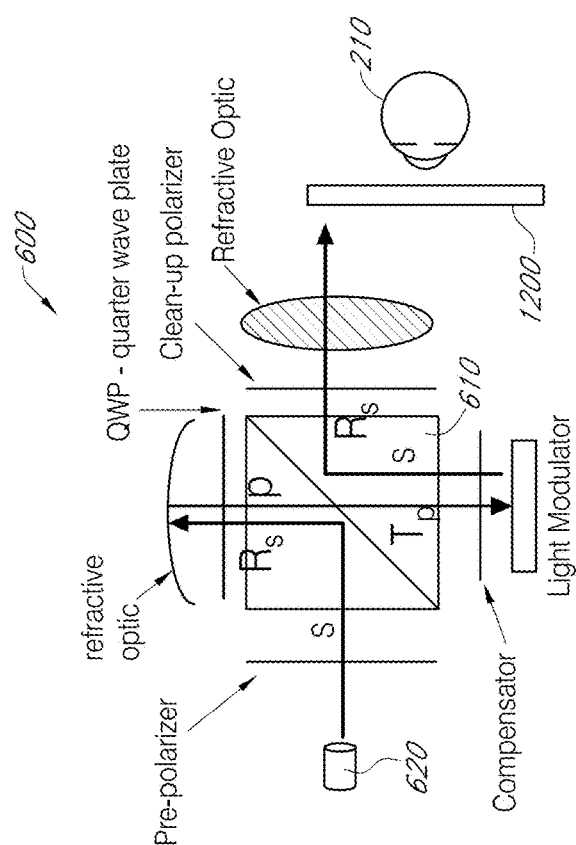
FIG. 11 illustrates a schematic plan view of a twin fold PBS display assembly comprising a polarizing beam splitter, a light source, a light modulator, and a reflector.

A more compact PBS display assembly is provided herein. FIG. 11 illustrates a schematic plan view of a twin-fold PBS display assembly 600 comprising a polarizing beam splitter 610, a light source 620, a light modulator, and a reflector or reflective optic. In some embodiments, the light source 620 is a light emitting diode (LED). In some other embodiments, the light source 620 may be, without limitation, a fluorescent light or an incandescent light. As illustrated, a pre-polarizer may be provided between the light source and the PBS 610. The pre-polarizer transmits light of one polarization (e.g., s-polarized light, S) to the PBS 610, which then reflects the s-polarized light ($R_s$) to the reflective optic. The reflective optic reflects the light back through the PBS 610 to the light modulator, e.g., a spatial light modulator. Preferably, the light modulator is a spatial light modulator which modulates incident light to form an image and also reflects and changes the polarization of the incident light. In some embodiments, the light modulator is a reflective liquid crystal display, such as a liquid crystal on silicon (LCOS) display. The modulated and reflected light from the light modulator is reflected back into the PBS 610, which then reflects that light towards the waveguide assembly 1200.

With continued reference to FIG. 11, in some embodiments, a quarter wave plate (QWP) may be disposed between the PBS 610 and a reflective optic. In addition, in some embodiments, a compensator may be disposed between the light modulator and the PBS 610. In some embodiments, a cleanup polarizer may be provided between the PBS 610 and the waveguide assembly 1200 to remove unintentionally transmitted light. In some embodiments, refractive optics (e.g., one or more lens structures) may be disposed between the cleanup polarizer and the waveguide assembly 1200. For example, the cleanup polarizer may be on the light output face of the PBS 610 facing the clean-up polarizer, or may be disposed spaced apart from the PBS 610 in the path of light between the PBS 610 and the waveguide assembly 1200.

Advantageously, use of the reflective refractive optic in combination with the PBS 610, the light source 620, and the light modulator provides a compact PBS display assembly 600 by reducing the required spacing between the light source 620 and the PBS 610 relative to configurations without a reflective refractive optic, such as those shown in FIGS. 10A and 10B. Due to the multiple reflections of light in the assembly, the PBS display assembly 600 may also be referred to as a twin fold assembly. Advantageously, the multiple reflections provide a long path length of light to the light modulator in more compact package, relative to the display assemblies 500a and 500b of FIGS. 10A and 10B.

Figure 12:
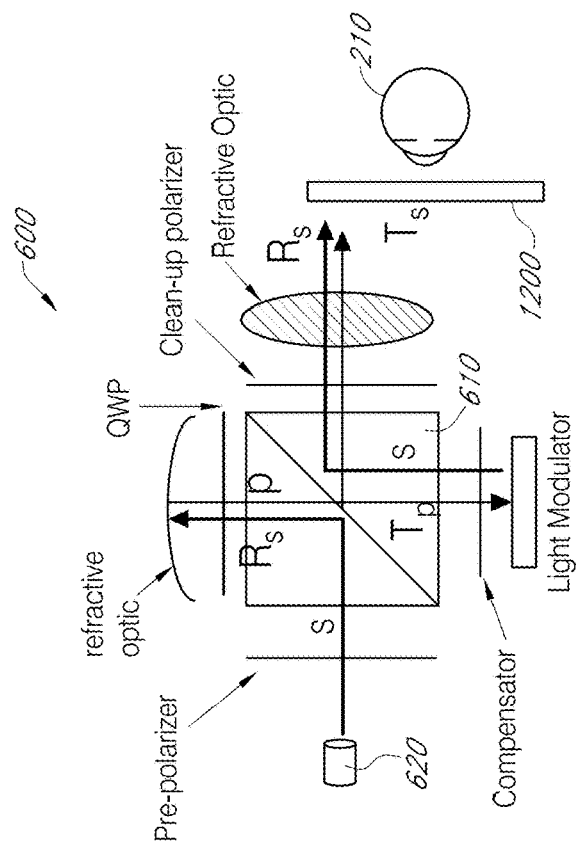
FIG. 12 illustrates a schematic plan view of a twin fold PBS display assembly having light leakage.

It will be appreciated, however, that a PBS may not be perfectly selective in reflecting and/or transmitting light of particular polarizations. For example, rather than reflecting all s-polarized light from the light source 620 to the reflective refractive optic, some of this light may be transmitted through the PBS 610 directly towards the viewer (via the waveguide assembly 1200), thereby causing glare that may reduce contrast. FIG. 12 illustrates a schematic plan view of a twin fold PBS display assembly 600 having light leakage. As illustrated, s-polarized light from the light source 620 is transmitted to the PBS 610 as $T_s$. The majority of the s-polarized light from the light source 620 is reflected by the PBS 610 to the reflective optic, however, a small percentage may be transmitted through the PBS 610 directly towards the waveguide assembly 1200. This directly transmitted light is not modulated by the light modulator and can result in both a perceived reduction in image quality and in glare.

It has been found that such glare and reduction in image quality is not present in larger PBS display assemblies that do not utilize the reflective optic. For example, FIGS. 13A-13B illustrate schematic plan views of PBS display assemblies 500a and 500b having light leakage that does not reach the viewer's eye 210. Rather, due to the orientation of the viewer's eyes 210 relative to the light source 620, light that is unintentionally transmitted by the PBS 610 propagates in a different direction than towards the waveguide assembly 1200.

Figure 14A:
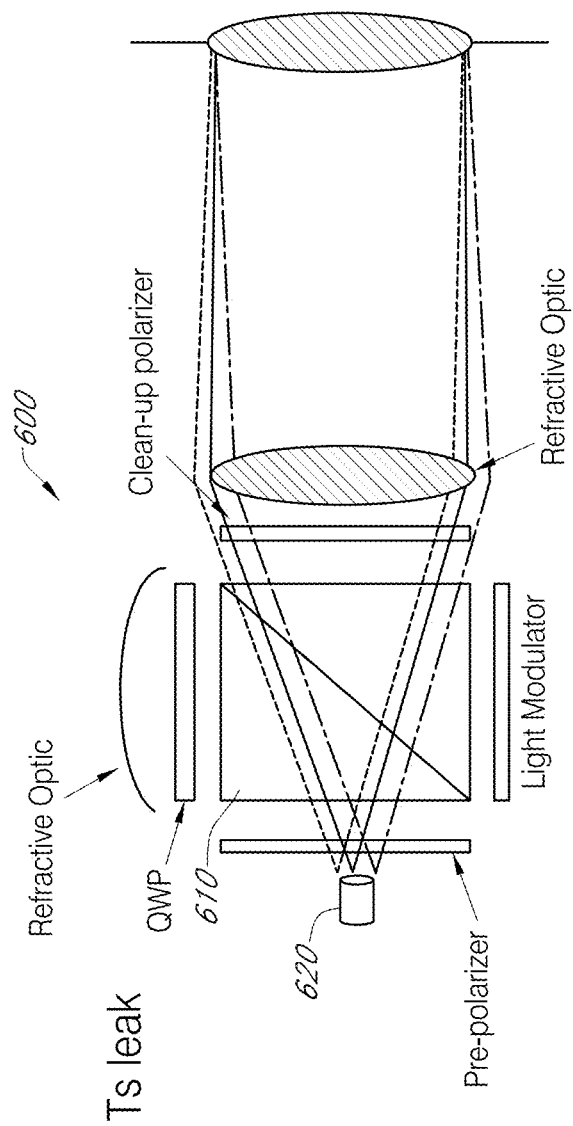
FIGS. 14A-14B illustrate schematic cross-sectional views of a PBS display assembly having light leakage that reaches the viewer.
Figure 14B:
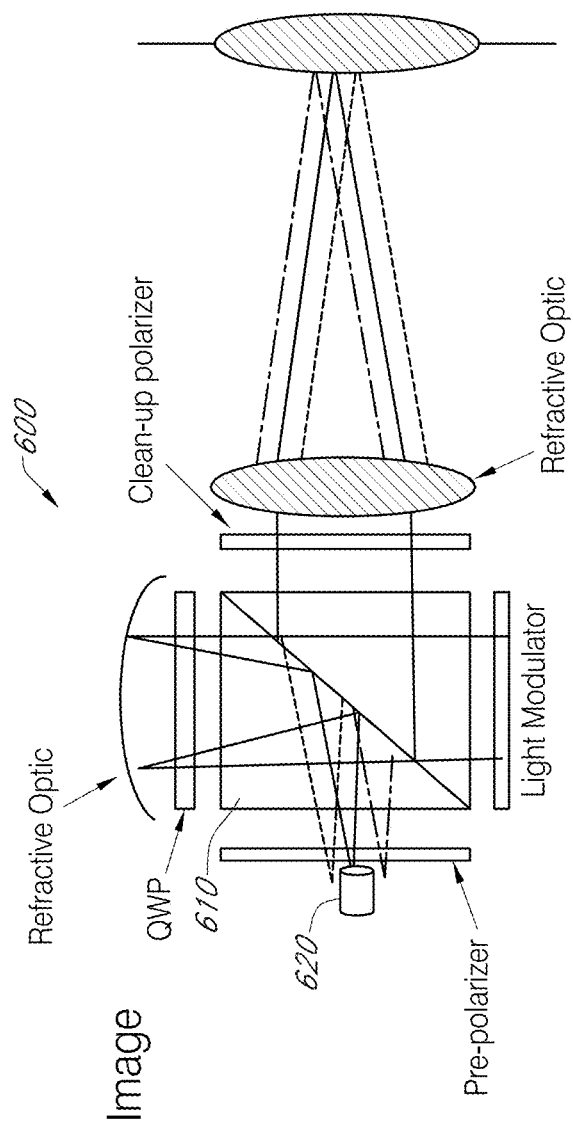
Figure 14C:
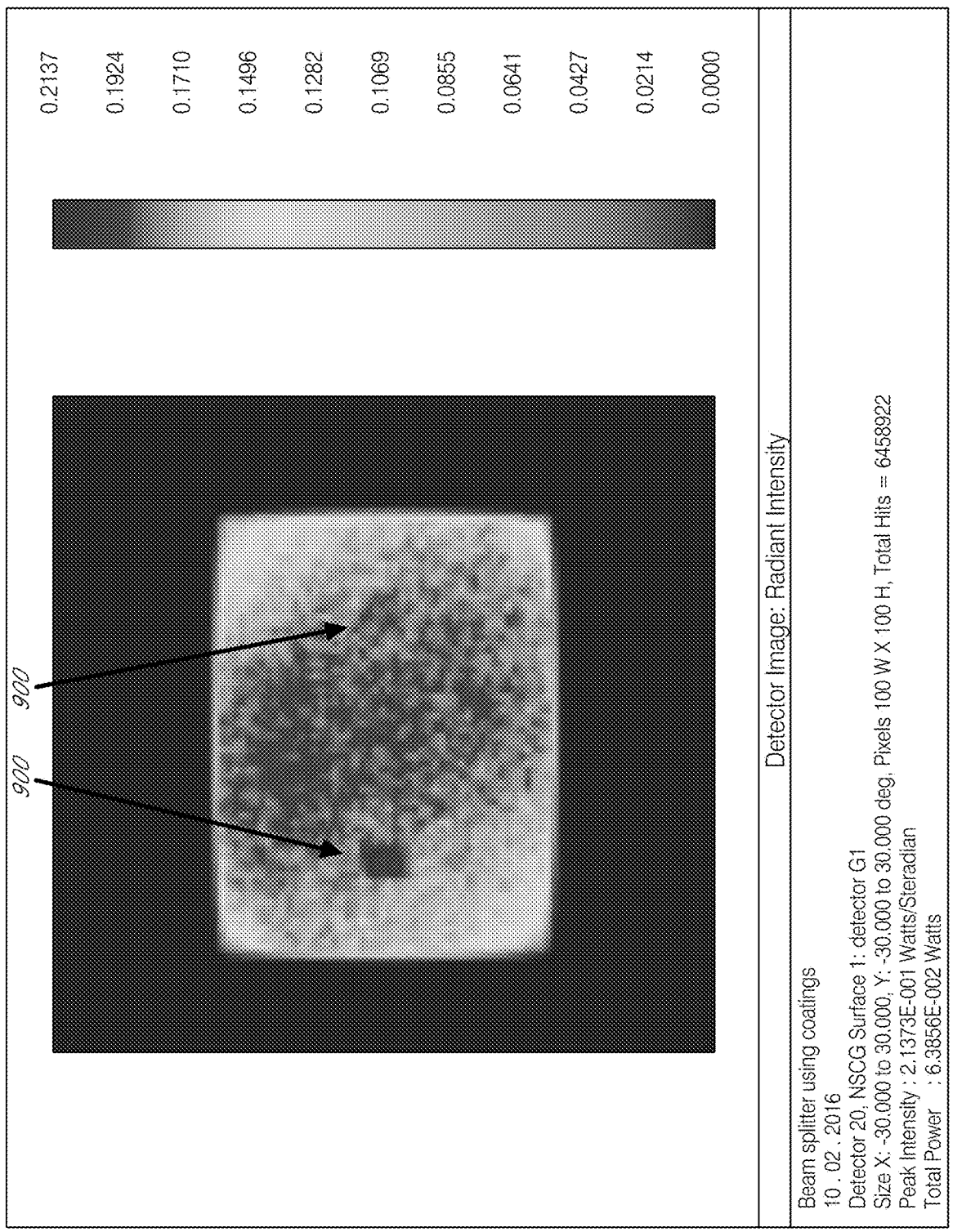
FIG. 14C illustrates a map of light intensity showing the impact of the light leakage on an image.

On the other hand, FIGS. 14A-14B illustrate schematic cross-sectional views of a PBS display assembly 600 having light leakage that does reach the viewer via the waveguide assembly 1200. FIG. 14A illustrates how the light that is leaked is focused and FIG. 14B illustrates how light for generating an image is focused. Notably, the light that is leaked forms two distinct hot spots that may be seen by a viewer. FIG. 14C illustrates a map of light intensity showing the impact of the light leakage on an image. As illustrated, the hot spots 900 caused by the light leakage are readily apparent.

Figure 15:
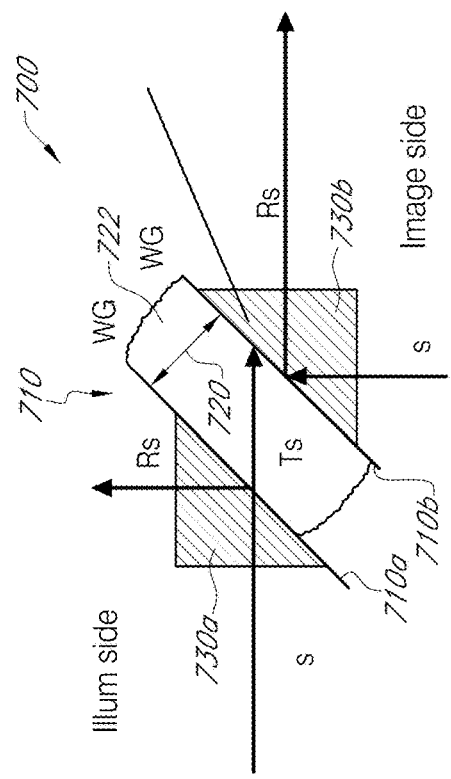
FIG. 15 illustrates a PBS display assembly having two spaced-apart polarizers.

Advantageously, in some embodiments, the light leakage may be mitigated using a PBS having two spaced-apart polarizers. FIG. 15 illustrates a PBS display assembly 700 having two spaced-apart polarizers 710a and 710b that are separated by a gap 720. FIG. 15 illustrates the PBS 710 of the display assembly 700 in isolation. The polarizers 710a and 710b divide the PBS 710 into two sections 730a and 730b. The features of the PBS display assembly 700 may be similar to those of the PBS display assembly 600 (FIG. 11), except for the replacement of the PBS 610 with the PBS 710. In some embodiments, the PBS display assembly 700 may be similar to the PBS display assembly 600, and have some or all the features discussed and illustrated in FIG. 11, except that the PBS 710 replaces the PBS 610 found in the PBS display assembly 600. The PBS 710 itself may be similar or identical to the PBS 610, except for the presence of the polarizers 710a and 710b and the intervening gap 720.

With continued reference to FIG. 15, the PBS 710 may have the overall shape of a rectangular solid, e.g., a cube, in some embodiments. The solid may be split into two sections along a line that runs diagonally on two opposing faces of the solid. In some embodiments, the PBS 710 may be formed of two triangular sections, or prisms, 730a and 730b that together from the rectangular solid, e.g., a cube. The two triangular sections or prisms 730a and 730b may be joined together by an adhesive, e.g., an index-matched adhesive. The triangular sections 730a and 730b may be formed of optically transmissive material, e.g., one or more of a glass and a plastic. Similarly, the adhesive may be optically transmissive.

In some embodiments, the polarizers 710a and 710b may be wire grid polarizers that are formed, e.g., by a pattern of parallel wires (such as metallic wires). In yet other embodiments, the polarizers 710a and 710b may be a thin film PBS coating (e.g., a dichroic (e.g., a MacNeille PBS). In some other embodiments, the polarizers 710a and 710b may be a multilayer birefringent stack. It will be appreciated that, in some embodiments, the polarizers 710a and 710b are the same type of polarizer (e.g., both the polarizers 710a and 710b may be wire grid polarizers). In some other embodiments, the polarizers 710a and 710b may be different types of polarizers (e.g. one may be a wire grid polarizer and the other may be a thin film PBS coating).

With continued reference to FIG. 15, the gap 720 may be filled with an index-matched material, e.g., a material having a refractive index that matches the refractive index of the sections 730a and 730b. For example, the refractive index of the material in the gap 720 may differ from the refractive index of the sections 730a and 730b by about 0.1 or less, about 0.05 or less, about 0.03 or less, or about 0.02 or less. In some embodiments, the indexed-match material is an index-matched adhesive that joins together the sections 730a and 730b. In some embodiments, the gap has a width of about 10 nm or more, 50 nm or more, 100 nanometers or more, 200 nm or more, 500 nm or more, 1 μm or more, 5 μm or more, or 10 μm or more. In addition, in some embodiments, the width is 20 μm or less, or 15 μm or less. It will be appreciated that the material filling the gap 720 may form an optically transmissive spacer 722.

Advantageously, the opposing polarizers 710a and 710b may reduce light leakage and significantly increase contrast. For example, in some embodiments, the amount of leaked light without the polarizers 710a and 710b may be 1.7%, which corresponds to a contrast ratio of 60:1. With the polarizers 710a and 710b present, the contrast ratio may be theoretically increased by the square of the numerator to 3600:1. In some embodiments, the actual contrast ratio may be 500:1 or higher, 1000:1 or higher, or 2000:1 or higher. Advantageously, the hotspots caused by transmission of leaked light are not visually discernible when using the polarizers 710a and 710b.

With continued reference to FIG. 15, the spacer 722 filling the gap 720 between the polarizers 710a and 710b may function as a waveguide. For example, light may propagate within the spacer 722 due to reflection, e.g., total internal reflection, at the mutually-facing opposing surfaces of the polarizers 710a and 710b. This reflection may be undesirable and may cause image artifacts.

Figure 16:
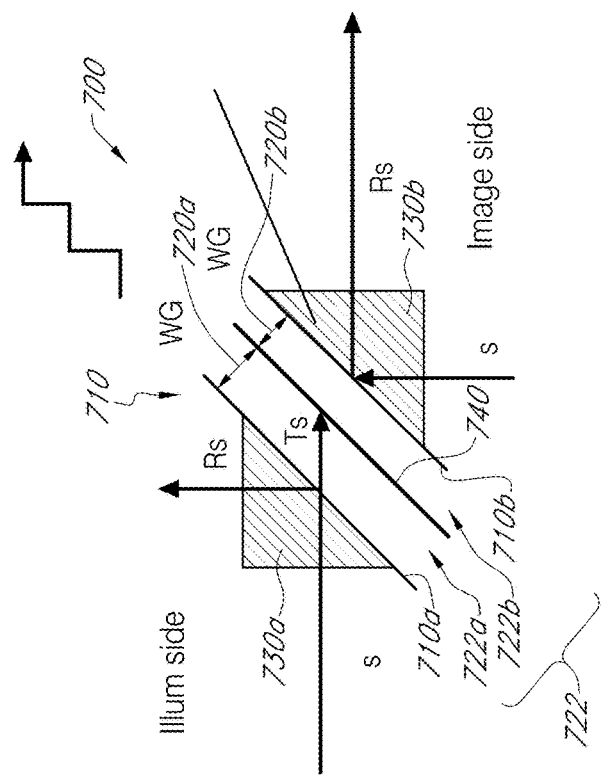
FIG. 16 illustrates a PBS display assembly having two spaced-apart polarizers with an intervening reflection-preventing polarizer.

In some embodiments, an absorptive polarizer may be provided within the spacer 722, between the polarizers 710a and 710b. FIG. 16 illustrates the PBS display assembly 700 having two spaced-apart polarizers 710a and 710b with an intervening reflection-preventing polarizer 740. The reflection-preventing polarizer 740 may be configured to absorb light in the gap between the polarizers 710a and 710b, thereby preventing or reducing reflection between the polarizers 710a and 710b. The polarization of the reflection preventing polarizer may be chosen to preferentially absorb light of the polarization transmitted by the polarizer 710a receiving light in the first instance from a light source. For example, the reflection preventing polarizer 740 may preferentially absorb Ts. Minimization of Ts is the main function of this polarizer 740. The reflection-preventing polarizer 740 may extend completely or only partially along the length of the gap 720. In some embodiments, the reflection-preventing polarizer 740 is an absorptive polarizer. In some other embodiments, the reflection-preventing polarizer 740 is an e-mode polarizer, an o-mode polarizer, or a polarizing stack with color selectivity. In some embodiments, the reflection-preventing polarizer 740 may be a combination of the above-noted polarizers and/or polarizing stack. Advantageously, the use of the reflection-preventing polarizer 740 with the polarizers 710a and 710b may provide contrast ratios of 2000:1 or higher.

With continued reference to FIG. 16, the reflection-preventing polarizer 740 is separated from the spaced-apart polarizers 710a and 710b by gaps 720a and 720b. In some embodiments, the gaps 720a and 720b each have a width of about 10 nm or more, 50 nm or more, 100 nanometers or more, 200 nm or more, 500 nm or more, 1 μm or more, 5 μm or more, or 10 μm or more. In addition, in some embodiments, the width of each gap 720a and 720b is 20 μm or less. Stated another way, the reflection-preventing polarizer 740 is disposed with in the spacer 722 and separates the spacer 722 into sections 722a and 722b. The section 722a has a thickness 720a and the section 722b has a thickness 720b.

Figure 17:
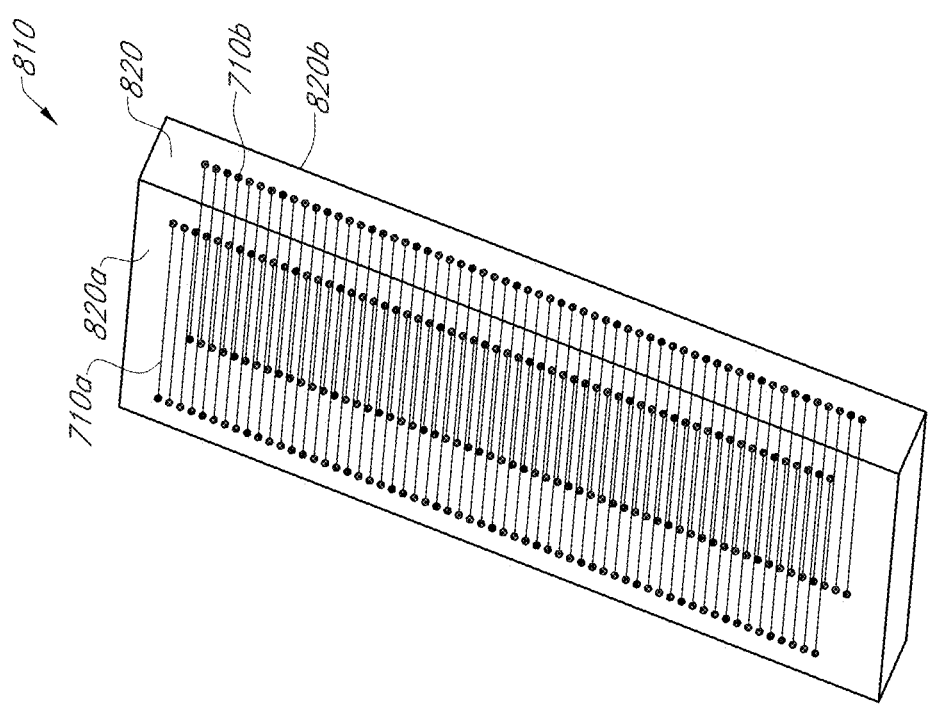
FIG. 17 illustrates a plate-type beam splitter having two spaced-apart polarizers on opposing surfaces of an optically transmissive spacer.

It will be appreciated that, in some embodiments, the spacer 722 may itself be the substrate that supports the spaced-apart polarizers. In such embodiments, the spacer preferably takes the form of a plate having sufficient rigidity and mechanical stability to support the spaced-apart polarizers without prisms on either side of the spacer. FIG. 17 illustrates a plate-type beam splitter 810 having two spaced-apart polarizers 710a and 710b on opposing surfaces, or faces, 820a and 820b of an optically transmissive spacer 820. The optically transmissive spacer 820 may be formed of, e.g., a glass or an optically transmissive polymer. It will be appreciated that the beam splitter 810 may replace the beam splitter 610 of the display assembly 600 in some embodiments.

The spaced-apart polarizers 710a and 710b may be as described herein. As noted above, in some embodiments, the polarizers 710a and 710b may be wire grid polarizers that are formed by, e.g., a pattern of parallel wires (such as metallic wires). In some embodiments, the polarizers 710a and 710b may be a thin film PBS coating (e.g., a dichroic coating, such as a MacNeille PBS). In some other embodiments, the polarizers 710a and 710b may be a multilayer birefringent stack. The polarizers 710a and 710b may be the same type of polarizer (e.g., both the polarizers 710a and 710b may be wire grid polarizers). In some other embodiments, the polarizers 710a and 710b may be different types of polarizers (e.g. one may be a wire grid polarizer and the other may be a thin film PBS coating).

With continued reference to FIG. 17, the spacer 820 may have the shape of a rectangular plate and the plate may be flat in some embodiments. The opposing faces 820a and 820b may each be planar and may be substantially parallel to one another, which may in turn orient the polarizers 710a and 710b substantially parallel to one another.

Figure 18:
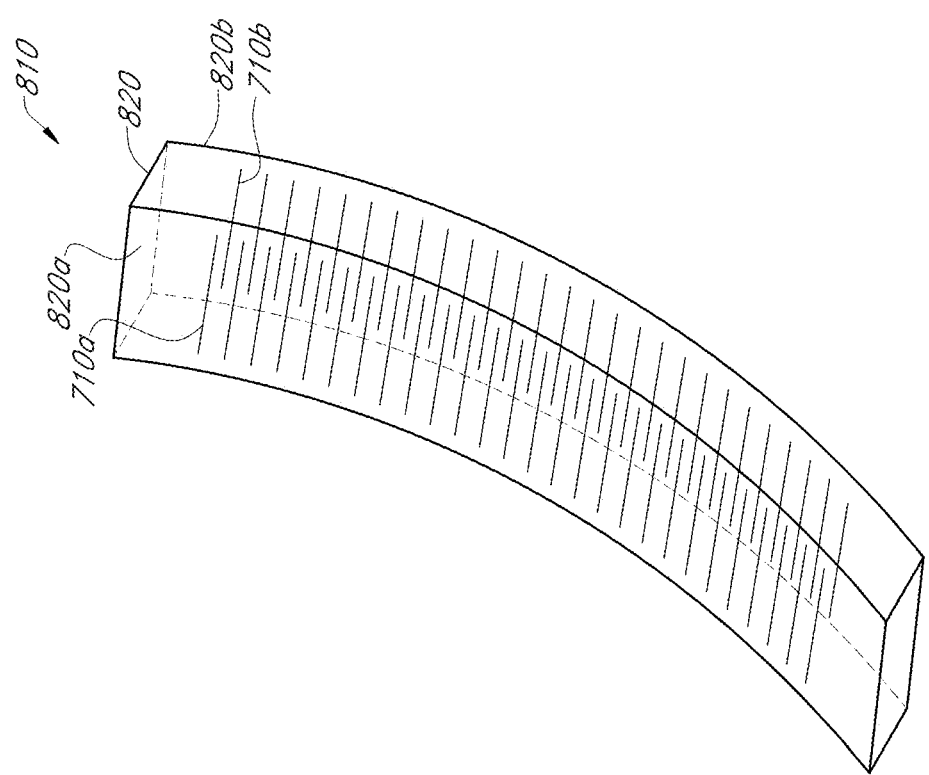
FIG. 18 illustrates a curved plate-type beam splitter having two spaced-apart polarizers on opposing surfaces of an optically transmissive spacer.

In some other embodiments, the spacer 820 may have the shape of a plate that is curved. FIG. 18 illustrates a curved plate-type beam splitter 810 having two spaced-apart polarizers 710a and 710b on opposing surfaces 820a and 820b of the spacer 820. As illustrated, the spacer 820 may be curved along the length dimension of the spacer 820. In some embodiments, the opposing surfaces 820a and 820b are substantially parallel to one another as are the polarizers 710a and 710b. It will be appreciated that, in some embodiments, the spacer 820 may be curved so as to provide curvature for the polarizers 710a and 710b, which can then advantageously provide a degree of beam shaping for light that is reflected off of the polarizers 710a and 710b.

As discussed herein, the spacer 820 may undesirably act as a waveguide in some cases, with light reflecting back and forth between the surfaces 820a and 820b. To reduce such reflections, a reflection-preventing polarizer may be provided within the spacer 820 in some embodiments. FIG. 19 illustrates two examples of a plate-type beam splitter 810 containing an intervening reflection-preventing polarizer 740. The reflection-preventing polarizer 740 may be as described herein. For example, the reflection-preventing polarizer 740 may be an absorptive polarizer in some embodiments. In some other embodiments, the reflection-preventing polarizer 740 may be an e-mode polarizer, an o-mode polarizer, or a polarizing stack with color selectivity, as disclosed herein. In some embodiments, the reflection-preventing polarizer 740 may be a combination of the above-noted polarizers and/or polarizing stack.

With continued reference to FIG. 19, the reflection-preventing polarizer 740 may extend completely (example A) or only partially (example B) along the length of the plate-type beam splitter 810. In some embodiments, the reflection-preventing polarizer 740 may divide the spacer 820 into two parts 820a and 820b. These parts may be joined together by, e.g., an optically transmissive adhesive such as an index-matched adhesive. It will be appreciated that while shown as a flat plate for ease of illustration, the spacer 820 may also be curved as described with reference to FIG. 18 above. In such embodiments, the reflection-preventing polarizer 740 may follow the curve of the spacer 820.

Example Display Systems

It will be appreciated that the PBS assembly may be utilized in various illumination applications in which a small volume assembly is desired. For example, the PBS assembly may advantageously be utilized in portable, e.g., head-mounted display systems.

In some embodiments, the PBS assembly may be used for image generation in augmented or virtual reality display systems. In some embodiments, these display systems may by wearable and portable, and may present images on multiple depth planes.

Figure 1:
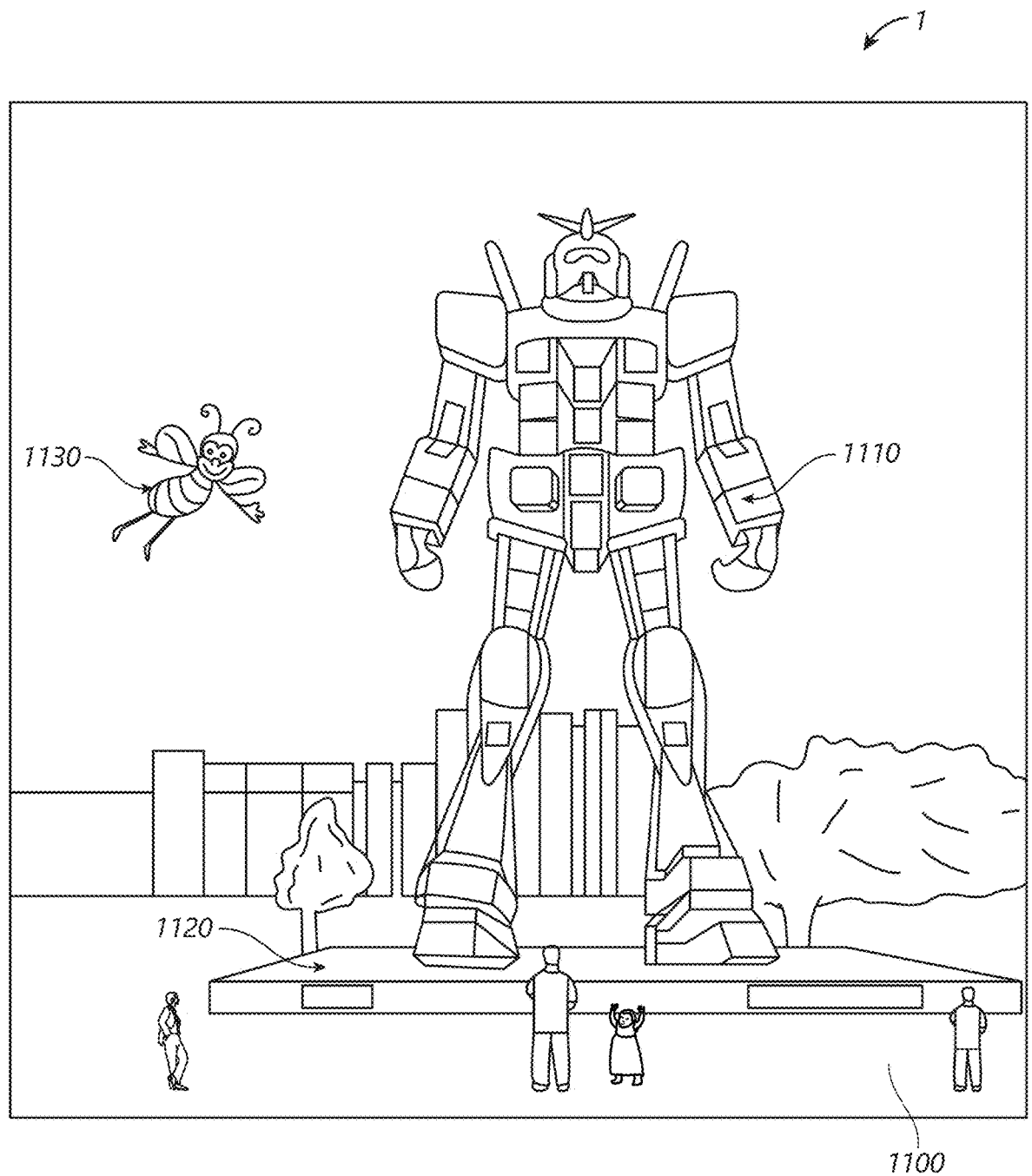
FIG. 1 illustrates a user's view of augmented reality (AR) through an AR device.

With reference to FIG. 1, an augmented reality scene 1 is depicted. It will be appreciated that modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

With continued reference to FIG. 1, an augmented reality scene 1 is depicted. The user of an AR technology sees a real-world park-like setting 1100 featuring people, trees, buildings in the background, and a concrete platform 1120. In addition to these items, the user of the AR technology also perceives that he "sees" a robot statue 1110 standing upon the real-world platform 1120, and a cartoon-like avatar character 1130 flying by which seems to be a personification of a bumble bee, even though these elements 1130, 1110 do not exist in the real world. Because the human visual perception system is complex, it is challenging to produce a VR or AR technology that facilitates a comfortable, natural-feeling, rich presentation of virtual image elements amongst other virtual or real-world imagery elements.

Figure 2:
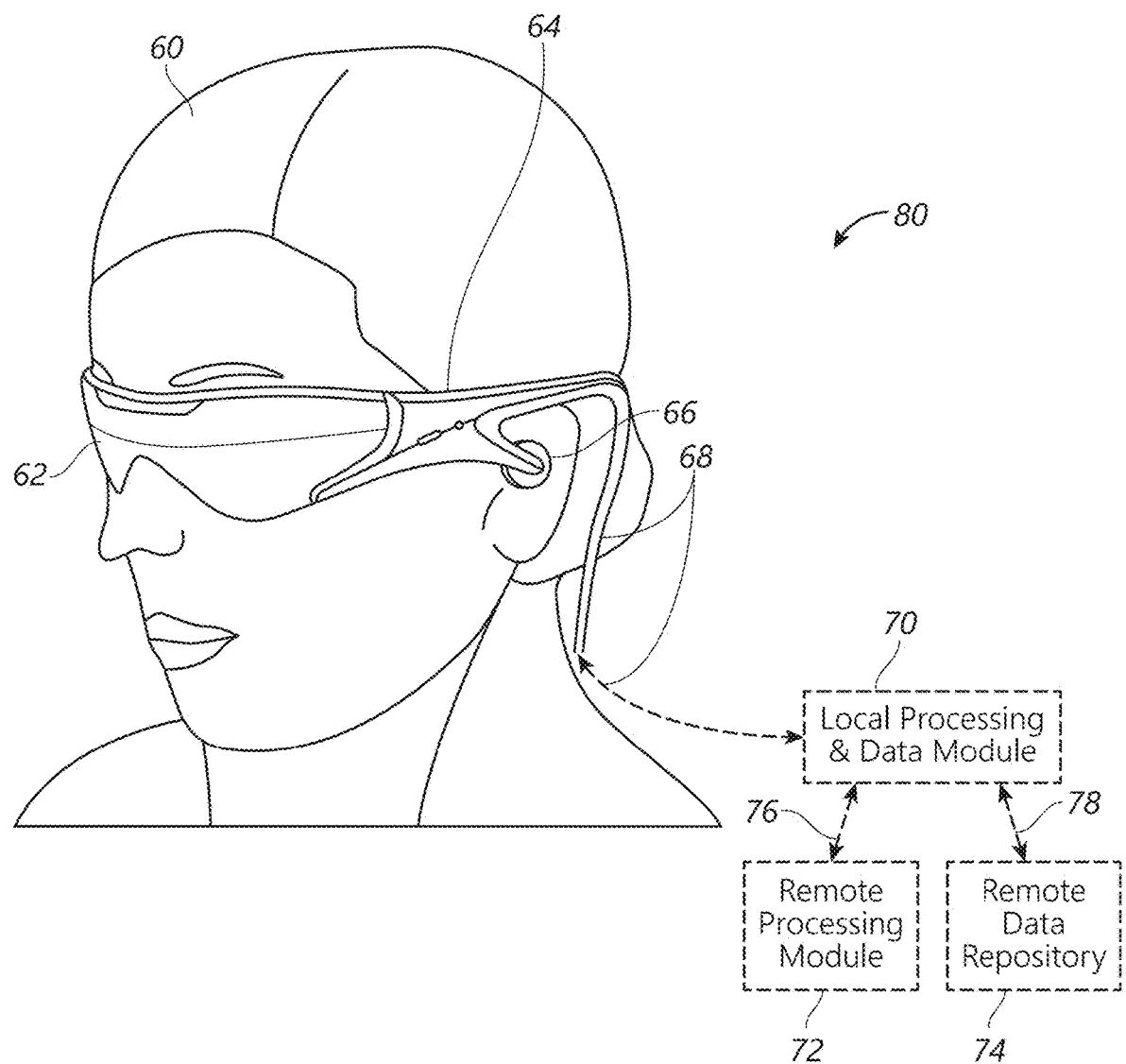
FIG. 2 illustrates an example of wearable display system.

FIG. 2 illustrates an example of wearable display system 80. The display system 80 includes a display 62, and various mechanical and electronic modules and systems to support the functioning of that display 62. The display 62 may be coupled to a frame 64, which is wearable by a display system user or viewer 60 and which is configured to position the display 62 in front of the eyes of the user 60. The display 62 may be considered eyewear in some embodiments. In some embodiments, a speaker 66 is coupled to the frame 64 and positioned adjacent the ear canal of the user 60 (in some embodiments, another speaker, not shown, is positioned adjacent the other ear canal of the user to provide for stereo/shapeable sound control). In some embodiments, the display system may also include one or more microphones 67 or other devices to detect sound. In some embodiments, the microphone is configured to allow the user to provide inputs or commands to the system 80 (e.g., the selection of voice menu commands, natural language questions, etc.) and/or may allow audio communication with other persons (e.g., with other users of similar display systems).

With continued reference to FIG. 2, the display 62 is operatively coupled 68, such as by a wired lead or wireless connectivity, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration). The local processing and data module 70 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 64 or otherwise attached to the user 60), such as image capture devices (such as cameras), microphones, inertial measurement units, accelerometers, compasses, GPS units, radio devices, and/or gyros; and/or b) acquired and/or processed using remote processing module 72 and/or remote data repository 74, possibly for passage to the display 62 after such processing or retrieval. The local processing and data module 70 may be operatively coupled by communication links 76, 78, such as via a wired or wireless communication links, to the remote processing module 72 and remote data repository 74 such that these remote modules 72, 74 are operatively coupled to each other and available as resources to the local processing and data module 70. In some embodiments, the location processing and data module 70 may include one or more of the image capture devices, microphones, inertial measurement units, accelerometers, compasses, GPS units, radio devices, and/or gyros. In some other embodiments, one or more of these sensors may be attached to the frame 64, or may be standalone structures that communicate with the location processing and data module 70 by wired or wireless communication pathways.

With continued reference to FIG. 2, in some embodiments, the remote processing module 72 may comprise one or more processors configured to analyze and process data and/or image information. In some embodiments, the remote data repository 74 may comprise a digital data storage facility, which may be available through the internet or other networking configuration in a "cloud" resource configuration. In some embodiments, the remote data repository 74 may include one or more remote servers, which provide information, e.g., information for generating augmented reality content, to the local processing and data module 70 and/or the remote processing module 72. In some embodiments, all data is stored and all computations are performed in the local processing and data module, allowing fully autonomous use from a remote module.

Figure 3:
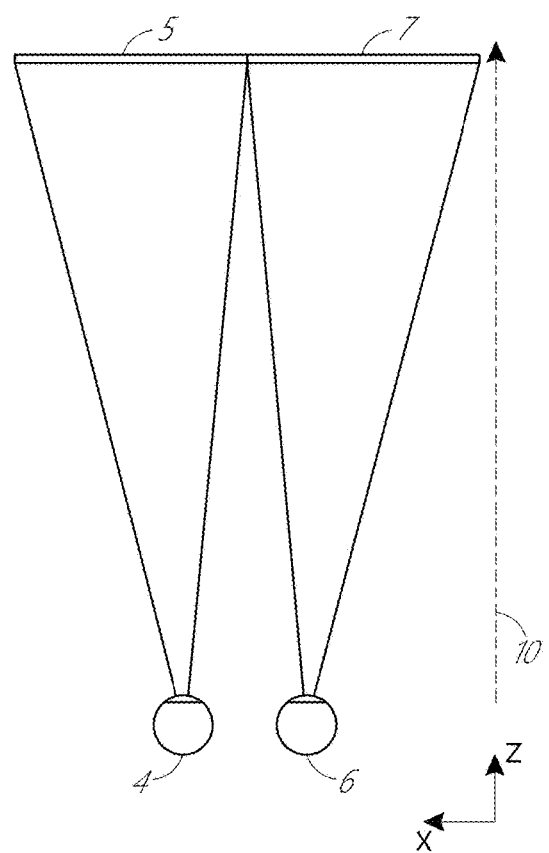
FIG. 3 illustrates a conventional display system for simulating three-dimensional imagery for a user.

With reference now to FIG. 3, the perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 5, 7—one for each eye 4, 6—are outputted to the user. The images 5, 7 are spaced from the eyes 4, 6 by a distance 10 along an optical or z-axis parallel to the line of sight of the viewer. The images 5, 7 are flat and the eyes 4, 6 may focus on the images by assuming a single accommodated state. Such systems rely on the human visual system to combine the images 5, 7 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
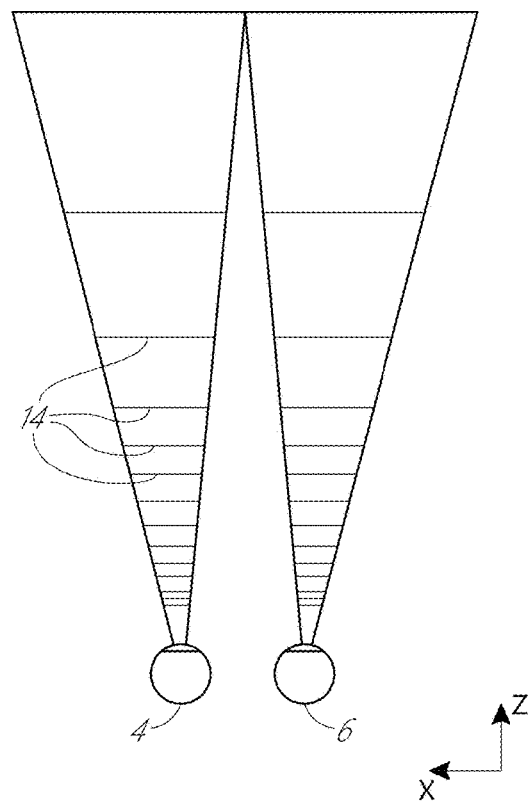
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 4, 6 on the z-axis are accommodated by the eyes 4, 6 so that those objects are in focus. The eyes (4 and 6) assume particular accommodated states to bring into focus objects at different distances along the z-axis. Consequently, a particular accommodated state may be said to be associated with a particular one of depth planes 14, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 4, 6, and also by providing different presentations of the image corresponding to each of the depth planes. While shown as being separate for clarity of illustration, it will be appreciated that the fields of view of the eyes 4, 6 may overlap, for example, as distance along the z-axis increases. It will addition, while shown as flat for ease of illustration, it will be appreciated that the contours of a depth plane may be curved in physical space, such that all features in a depth plane are in focus with the eye in a particular accommodated state.

Figure 5A:
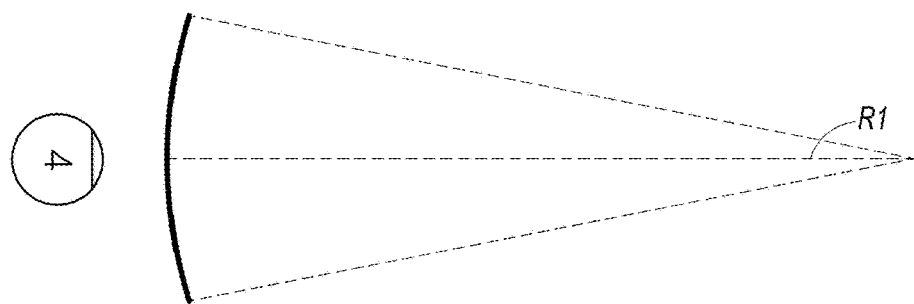
FIGS. 5A-5C illustrate relationships between radius of curvature and focal radius.
Figure 5B:
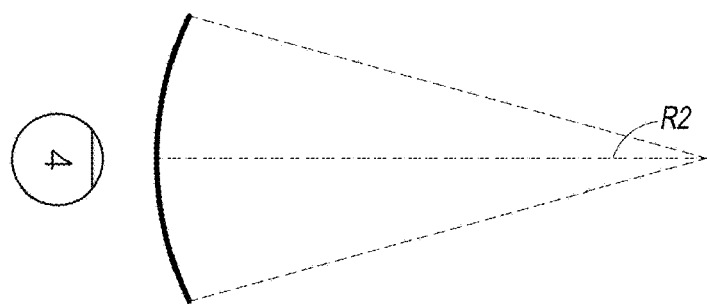
Figure 5C:
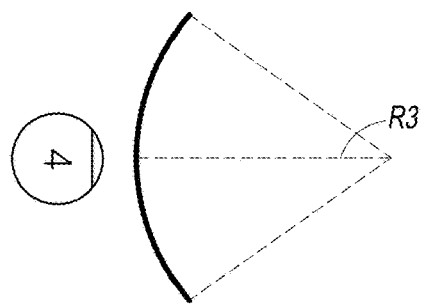

The distance between an object and the eye 4 or 6 can also change the amount of divergence of light from that object, as viewed by that eye. FIGS. 5A-5C illustrates relationships between distance and the divergence of light rays. The distance between the object and the eye 4 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 4. Consequently, at different depth planes, the degree of divergence of light rays is also different, with the degree of divergence increasing with decreasing distance between depth planes and the viewer's eye 4. While only a single eye 4 is illustrated for clarity of illustration in FIGS. 5A-5C and other figures herein, it will be appreciated that the discussions regarding eye 4 may be applied to both eyes 4 and 6 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
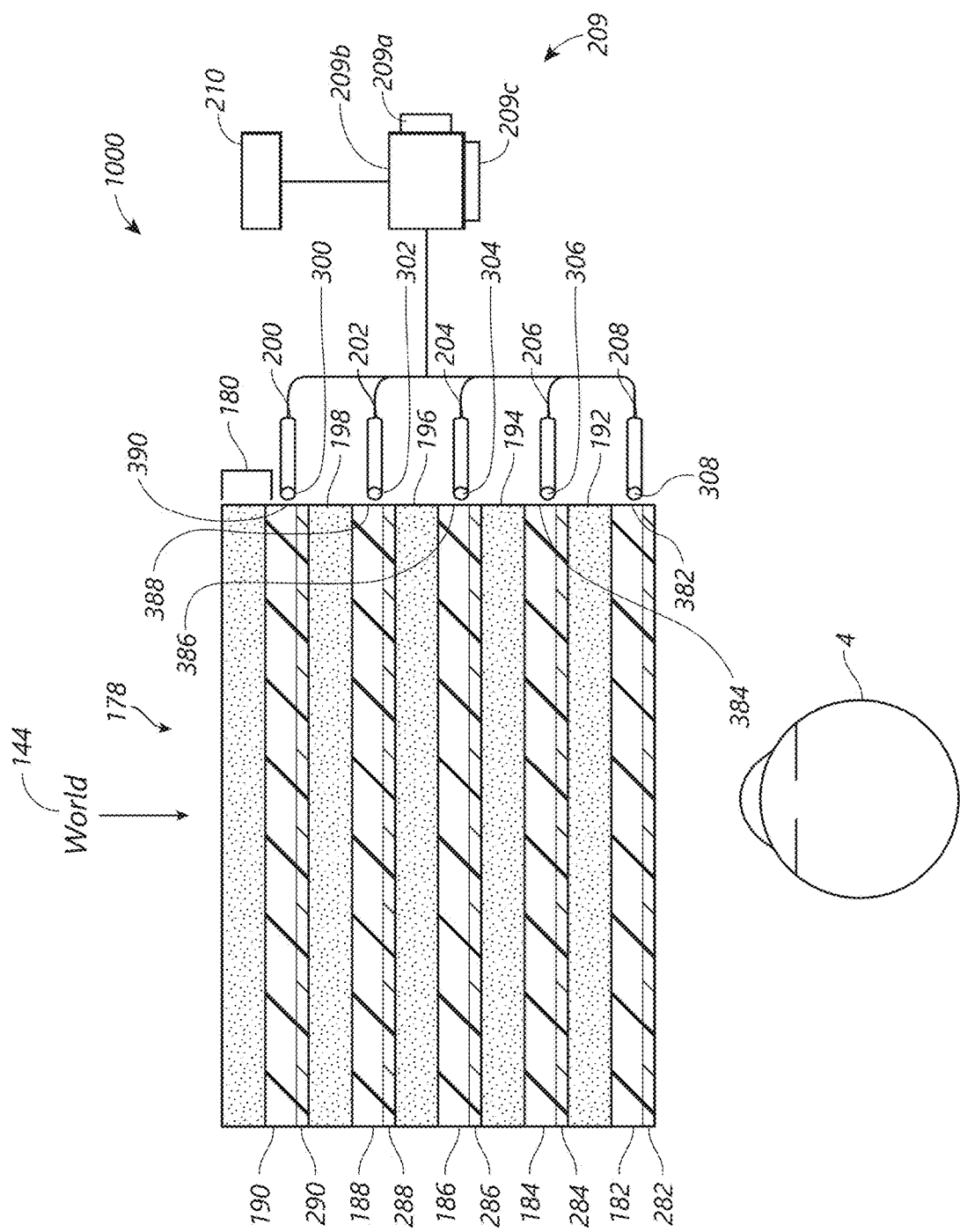
FIG. 6 illustrates an example of a waveguide stack for outputting image information to a user.

FIG. 6 illustrates an example of a waveguide stack for outputting image information to a user. A display system 1000 includes a stack of waveguides, or stacked waveguide assembly, 178 that may be utilized to provide three-dimensional perception to the eye/brain using a plurality of waveguides 182, 184, 186, 188, 190. In some embodiments, the display system 1000 is the system 80 of FIG. 2, with FIG. 6 schematically showing some parts of that system 80 in greater detail. For example, the waveguide assembly 178 may be part of the display 62 of FIG. 2. It will be appreciated that the display system 250 may be considered a light field display in some embodiments.

With continued reference to FIG. 6, the waveguide assembly 178 may also include a plurality of features 198, 196, 194, 192 between the waveguides. In some embodiments, the features 198, 196, 194, 192 may be one or more lenses. The waveguides 182, 184, 186, 188, 190 and/or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 200, 202, 204, 206, 208 may function as a source of light for the waveguides and may be utilized to inject image information into the waveguides 182, 184, 186, 188, 190, each of which may be configured, as described herein, to distribute incoming light across each respective waveguide, for output toward the eye 4. Light exits an output surface 300, 302, 304, 306, 308 of the image injection devices 200, 202, 204, 206, 208 and is injected into a corresponding input surface 382, 384, 386, 388, 390 of the waveguides 182, 184, 186, 188, 190. In some embodiments, the each of the input surfaces 382, 384, 386, 388, 390 may be an edge of a corresponding waveguide, or may be part of a major surface of the corresponding waveguide (that is, one of the waveguide surfaces directly facing the world 144 or the viewer's eye 4). In some embodiments, a single beam of light (e.g. a collimated beam) may be injected into each waveguide to output an entire field of cloned collimated beams that are directed toward the eye 4 at particular angles (and amounts of divergence) corresponding to the depth plane associated with a particular waveguide. In some embodiments, a single one of the image injection devices 200, 202, 204, 206, 208 may be associated with and inject light into a plurality (e.g., three) of the waveguides 182, 184, 186, 188, 190.

In some embodiments, the image injection devices 200, 202, 204, 206, 208 are discrete displays that each produce image information for injection into a corresponding waveguide 182, 184, 186, 188, 190, respectively. In some other embodiments, the image injection devices 200, 202, 204, 206, 208 are the output ends of a single multiplexed display which may, e.g., pipe image information via one or more optical conduits (such as fiber optic cables) to each of the image injection devices 200, 202, 204, 206, 208. It will be appreciated that the image information provided by the image injection devices 200, 202, 204, 206, 208 may include light of different wavelengths, or colors (e.g., different component colors, as discussed herein).

In some embodiments, the light injected into the waveguides 182, 184, 186, 188, 190 is provided by the PBS display assembly 209 which comprises a light output module 209a, which may include a light source, such as a light emitting diode (LED) or a fluorescent bulb. It will be appreciated that the PBS display assembly 209 may correspond to the PBS display assemblies 600 (FIGS. 12) and 700 (FIGS. 15 and 16), with the light output module 209a corresponding to the light source 620 and the light modulator 209c corresponding to the light modulator of the PBS display assemblies 600 (FIGS. 12) and 700 (FIGS. 15 and 16). The light from the light output module 209a may be directed to and modified by a light modulator 209c, e.g., a spatial light modulator, via the PBS 209b. The light modulator 209c may be configured to change the perceived intensity of the light injected into the waveguides 182, 184, 186, 188, 190. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310.

A controller 210 controls the operation of one or more of the stacked waveguide assembly 178, including operation of the image injection devices 200, 202, 204, 206, 208, the light source 209a, and the light modulator 209b. In some embodiments, the controller 210 is part of the local data processing module 70. The controller 210 includes programming (e.g., instructions in a non-transitory medium) that regulates the timing and provision of image information to the waveguides 182, 184, 186, 188, 190 according to, e.g., any of the various schemes disclosed herein. In some embodiments, the controller may be a single integral device, or a distributed system connected by wired or wireless communication channels. The controller 210 may be part of the processing modules 70 or 72 (FIG. 1) in some embodiments.

With continued reference to FIG. 6, the waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include outcoupling optical elements 282, 284, 286, 288, 290 that are configured to extract light out of a waveguide by redirecting the light, propagating within each respective waveguide, out of the waveguide to output image information to the eye 4. Extracted light may also be referred to as outcoupled light and the outcoupling optical elements light may also be referred to light extracting optical elements. An extracted beam of light is outputted by the waveguide at locations at which the light propagating in the waveguide strikes a light extracting optical element. The outcoupling optical elements 282, 284, 286, 288, 290 may, for example, be gratings, including diffractive optical features, as discussed further herein. While illustrated disposed at the bottom major surfaces of the waveguides 182, 184, 186, 188, 190 for ease of description and drawing clarity, in some embodiments, the outcoupling optical elements 282, 284, 286, 288, 290 may be disposed at the top and/or bottom major surfaces, and/or may be disposed directly in the volume of the waveguides 182, 184, 186, 188, 190, as discussed further herein. In some embodiments, the outcoupling optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the outcoupling optical elements 282, 284, 286, 288, 290 may be formed on a surface and/or in the interior of that piece of material.

With continued reference to FIG. 6, as discussed herein, each waveguide 182, 184, 186, 188, 190 is configured to output light to form an image corresponding to a particular depth plane. For example, the waveguide 182 nearest the eye may be configured to deliver collimated light, as injected into such waveguide 182, to the eye 4. The collimated light may be representative of the optical infinity focal plane. The next waveguide up 184 may be configured to send out collimated light which passes through the first lens 192 (e.g., a negative lens) before it can reach the eye 4; such first lens 192 may be configured to create a slight convex wavefront curvature so that the eye/brain interprets light coming from that next waveguide up 184 as coming from a first focal plane closer inward toward the eye 4 from optical infinity. Similarly, the third up waveguide 186 passes its output light through both the first 192 and second 194 lenses before reaching the eye 4; the combined optical power of the first 192 and second 194 lenses may be configured to create another incremental amount of wavefront curvature so that the eye/brain interprets light coming from the third waveguide 186 as coming from a second focal plane that is even closer inward toward the person from optical infinity than was light from the next waveguide up 184.

The other waveguide layers 188, 190 and lenses 196, 198 are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the outcoupling optical elements of the waveguides and the focusing aspects of the lenses may be static (i.e., not dynamic or electro-active). In some alternative embodiments, either or both may be dynamic using electro-active features.

In some embodiments, two or more of the waveguides 182, 184, 186, 188, 190 may have the same associated depth plane. For example, multiple waveguides 182, 184, 186, 188, 190 may be configured to output images set to the same depth plane, or multiple subsets of the waveguides 182, 184, 186, 188, 190 may be configured to output images set to the same plurality of depth planes, with one set for each depth plane. This can provide advantages for forming a tiled image to provide an expanded field of view at those depth planes.

With continued reference to FIG. 6, the outcoupling optical elements 282, 284, 286, 288, 290 may be configured to both redirect light out of their respective waveguides and to output this light with the appropriate amount of divergence or collimation for a particular depth plane associated with the waveguide. As a result, waveguides having different associated depth planes may have different configurations of outcoupling optical elements 282, 284, 286, 288, 290, which output light with a different amount of divergence depending on the associated depth plane. In some embodiments, the light extracting optical elements 282, 284, 286, 288, 290 may be volumetric or surface features, which may be configured to output light at specific angles. For example, the light extracting optical elements 282, 284, 286, 288, 290 may be volume holograms, surface holograms, and/or diffraction gratings. In some embodiments, the features 198, 196, 194, 192 may not be lenses; rather, they may simply be spacers (e.g., cladding layers and/or structures for forming air gaps).

In some embodiments, the outcoupling optical elements 282, 284, 286, 288, 290 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 4 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 4 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

Figure 7:
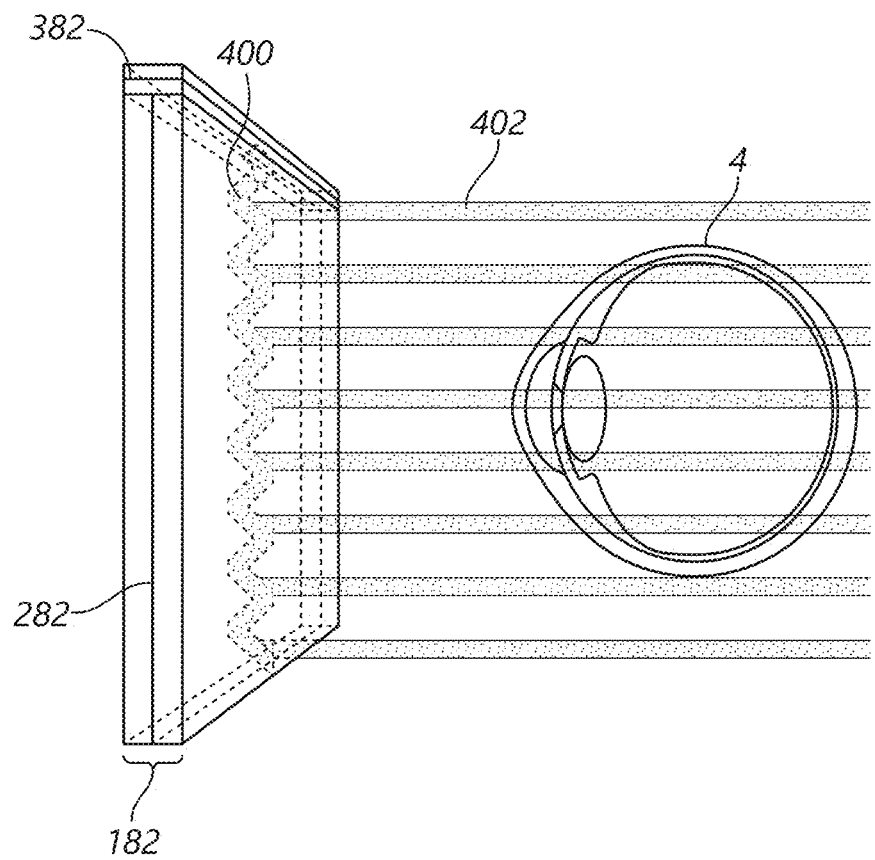
FIG. 7 illustrates an example of exit beams outputted by a waveguide.

FIG. 7 shows an example of exit beams outputted by a waveguide. One waveguide is illustrated, but it will be appreciated that other waveguides in the waveguide assembly 178 may function similarly, where the waveguide assembly 178 includes multiple waveguides. Light 400 is injected into the waveguide 182 at the input surface 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but, as discussed herein, they may also be redirected to propagate to the eye 4 at an angle (e.g., forming divergent exit beams), depending on the depth plane associated with the waveguide 182. It will be appreciated that substantially parallel exit beams may be indicative of a waveguide with outcoupling optical elements that outcouple light to form images that appear to be set on a depth plane at a large distance (e.g., optical infinity) from the eye 4. Other waveguides or other sets of outcoupling optical elements may output an exit beam pattern that is more divergent, which would require the eye 4 to accommodate to a closer distance to bring it into focus on the retina and would be interpreted by the brain as light from a distance closer to the eye 4 than optical infinity.

In some embodiments, a full color image may be formed at each depth plane by overlaying images in each of the component colors, e.g., three or more component colors. FIG. 9 illustrates an example of a stacked waveguide assembly in which each depth plane includes images formed using multiple different component colors. The illustrated embodiment shows depth planes 14a—14f, although more or fewer depths are also contemplated. Each depth plane may have three component color images associated with it: a first image of a first color, G; a second image of a second color, R; and a third image of a third color, B. Different depth planes are indicated in the figure by different numbers for diopters following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

Figure 8:
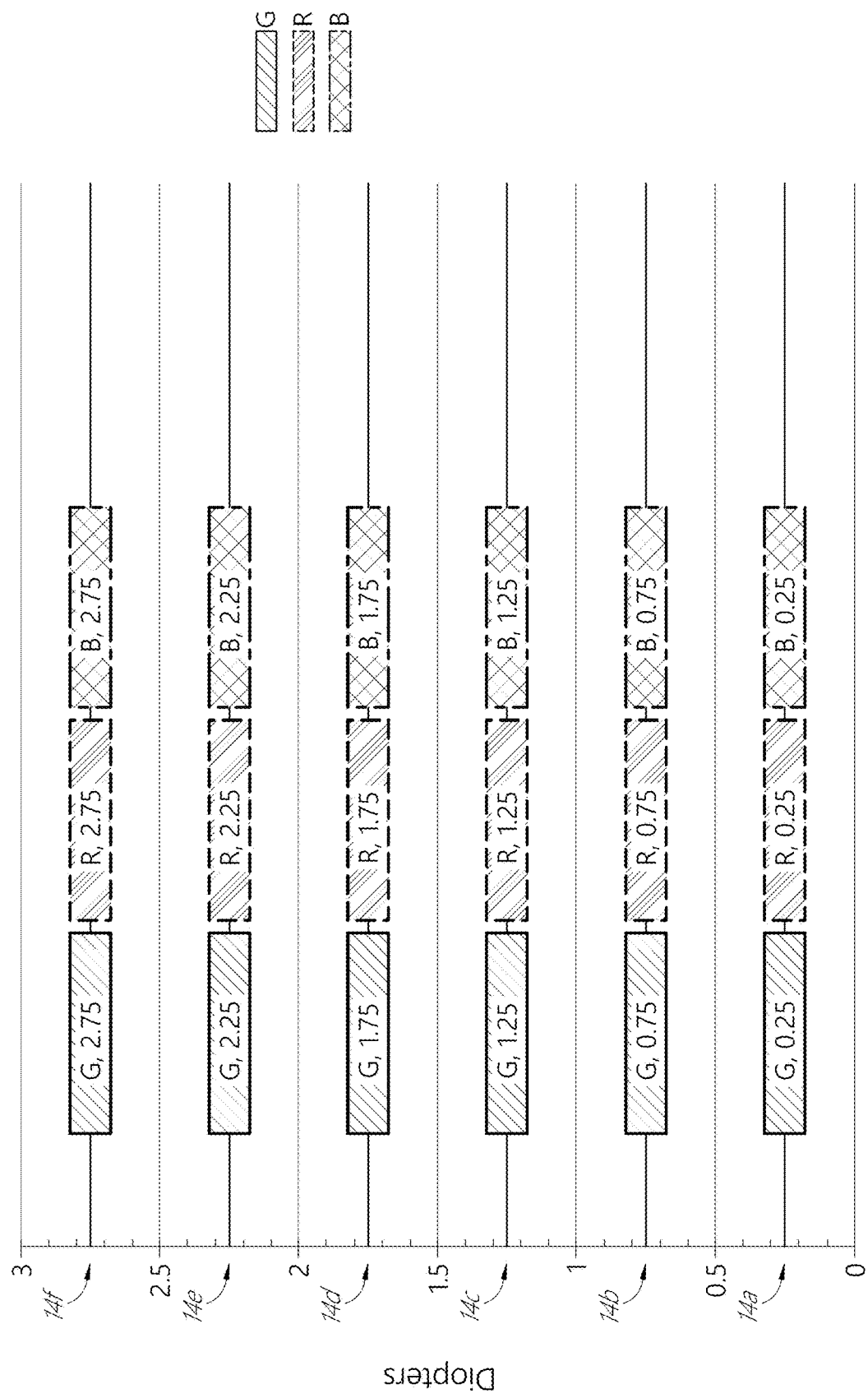
FIG. 8 illustrates an example of a stacked waveguide assembly in which each depth plane includes images formed using multiple different component colors.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

Figure 9A:
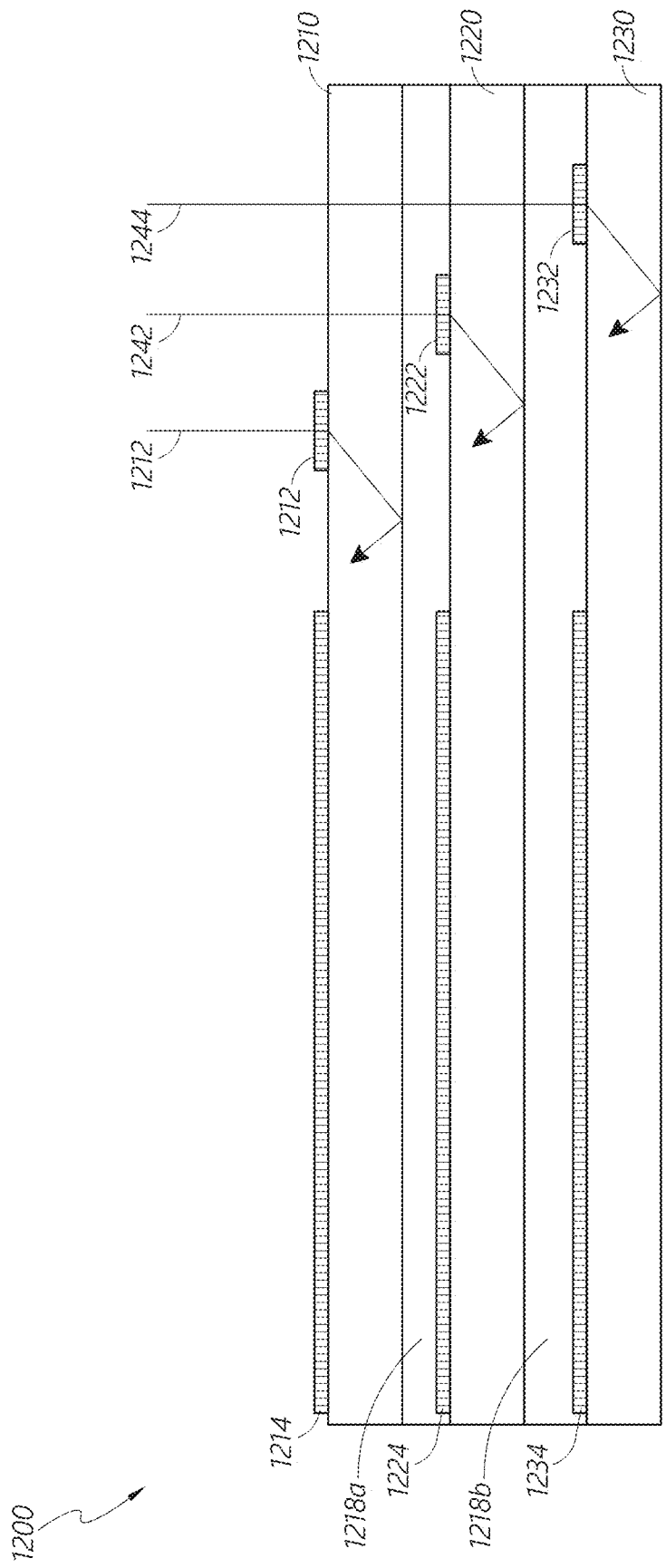
FIG. 9A illustrates a cross-sectional side view of an example of a set of stacked waveguides that each includes an incoupling optical element.

With reference now to FIG. 9A, in some embodiments, light impinging on a waveguide may need to be redirected to incouple that light into the waveguide. An incoupling optical element may be used to redirect and incouple the light into its corresponding waveguide. FIG. 9A illustrates a cross-sectional side view of an example of a plurality or set 1200 of stacked waveguides that each includes an incoupling optical element. The waveguides may each be configured to output light of one or more different wavelengths, or one or more different ranges of wavelengths. It will be appreciated that the stack 1200 may correspond to the stack 178 (FIG. 6) and the illustrated waveguides of the stack 1200 may correspond to part of the plurality of waveguides 182, 184, 186, 188, 190, except that light from one or more of the image injection devices 200, 202, 204, 206, 208 is injected into the waveguides from a position that requires light to be redirected for incoupling.

The illustrated set 1200 of stacked waveguides includes waveguides 1210, 1220, and 1230. Each waveguide includes an associated incoupling optical element, with, e.g., incoupling optical element 1212 disposed on a major surface (e.g., an upper major surface) of waveguide 1210, incoupling optical element 1224 disposed on a major surface (e.g., an upper major surface) of waveguide 1220, and incoupling optical element 1232 disposed on a major surface (e.g., an upper major surface) of waveguide 1230. In some embodiments, one or more of the incoupling optical elements 1212, 1222, 1232 may be disposed on the bottom major surface of the respective waveguide 1210, 1220, 1230 (particularly where the one or more incoupling optical elements are reflective, deflecting optical elements). As illustrated, the incoupling optical elements 1212, 1222, 1232 may be disposed on the upper major surface of their respective waveguide 1210, 1220, 1230 (or the top of the next lower waveguide), particularly where those incoupling optical elements are transmissive, deflecting optical elements. In some embodiments, the incoupling optical elements 1212, 1222, 1232 may be disposed in the body of the respective waveguide 1210, 1220, 1230. In some embodiments, as discussed herein, the incoupling optical elements 1212, 1222, 1232 are wavelength selective, such that they selectively redirect one or more wavelengths of light, while transmitting other wavelengths of light. While illustrated on one side or corner of their respective waveguide 1210, 1220, 1230, it will be appreciated that the incoupling optical elements 1212, 1222, 1232 may be disposed in other areas of their respective waveguide 1210, 1220, 1230 in some embodiments.

As illustrated, the incoupling optical elements 1212, 1222, 1232 may be laterally offset from one another. In some embodiments, each incoupling optical element may be offset such that it receives light without that light passing through another incoupling optical element. For example, each incoupling optical element 1212, 1222, 1232 may be configured to receive light from a different image injection device 1213, 1223, 1233 and may be separated (e.g., laterally spaced apart) from other incoupling optical elements 1212, 1222, 1232 such that it substantially does not receive light from the other ones of the incoupling optical elements 1212, 1222, 1232.

Each waveguide also includes associated light distributing elements, with, e.g., light distributing elements 1214 disposed on a major surface (e.g., a top major surface) of waveguide 1210, light distributing elements 1224 disposed on a major surface (e.g., a top major surface) of waveguide 1220, and light distributing elements 1234 disposed on a major surface (e.g., a top major surface) of waveguide 1230. In some other embodiments, the light distributing elements 1214, 1224, 1234, may be disposed on a bottom major surface of associated waveguides 1210, 1220, 1230, respectively. In some other embodiments, the light distributing elements 1214, 1224, 1234, may be disposed on both top and bottom major surface of associated waveguides 1210, 1220, 1230, respectively; or the light distributing elements 1214, 1224, 1234, may be disposed on different ones of the top and bottom major surfaces in different associated waveguides 1210, 1220, 1230, respectively.

The waveguides 1210, 1220, 1230 may be spaced apart and separated by gas and/or solid layers of material. For example, as illustrated, layer 1218a may separate waveguides 1210 and 1220; and layer 1218b may separate waveguides 1220 and 1230. In some embodiments, the layers 1218a and 1218b are formed of low refractive index materials (that is, materials having a lower refractive index than the material forming the immediately adjacent one of waveguides 1210, 1220, 1230). Preferably, the refractive index of the material forming the layers 1218a, 1218b is 0.05 or more, or 0.10 or more less than the refractive index of the material forming the waveguides 1210, 1220, 1230. Advantageously, the lower refractive index layers 1218a, 1218b may function as cladding layers that facilitate total internal reflection (TIR) of light through the waveguides 1210, 1220, 1230 (e.g., TIR between the top and bottom major surfaces of each waveguide). In some embodiments, the layers 1218a, 1218b are formed of air. While not illustrated, it will be appreciated that the top and bottom of the illustrated set 1200 of waveguides may include immediately neighboring cladding layers.

Preferably, for ease of manufacturing and other considerations, the material forming the waveguides 1210, 1220, 1230 are similar or the same, and the material forming the layers 1218a, 1218b are similar or the same. In some embodiments, the material forming the waveguides 1210, 1220, 1230 may be different between one or more waveguides, and/or the material forming the layers 1218a, 1218b may be different, while still holding to the various refractive index relationships noted above.

With continued reference to FIG. 9A, light rays 1240, 1242, 1244 are incident on the set 1200 of waveguides. It will be appreciated that the light rays 1240, 1242, 1244 may be injected into the waveguides 1210, 1220, 1230 by one or more image injection devices 200, 202, 204, 206, 208 (FIG. 6).

In some embodiments, the light rays 1240, 1242, 1244 have different properties, e.g., different wavelengths or different ranges of wavelengths, which may correspond to different colors. The incoupling optical elements 1212, 122, 1232 each deflect the incident light such that the light propagates through a respective one of the waveguides 1210, 1220, 1230 by TIR. In some embodiments, the incoupling optical elements 1212, 122, 1232 each selectively deflect one or more particular wavelengths of light, while transmitting other wavelengths to an underlying waveguide and associated incoupling optical element.

For example, incoupling optical element 1212 may be configured to deflect ray 1240, which has a first wavelength or range of wavelengths, while transmitting rays 1242 and 1244, which have different second and third wavelengths or ranges of wavelengths, respectively. The transmitted ray 1242 impinges on and is deflected by the incoupling optical element 1222, which is configured to deflect light of a second wavelength or range of wavelengths. Likewise, the ray 1244 is deflected by the incoupling optical element 1232, which is configured to selectively deflect light of third wavelength or range of wavelengths.

With continued reference to FIG. 9A, the deflected light rays 1240, 1242, 1244 are deflected so that they propagate through a corresponding waveguide 1210, 1220, 1230; that is, the incoupling optical elements 1212, 1222, 1232 of each waveguide deflects light into that corresponding waveguide 1210, 1220, 1230 to incouple light into that corresponding waveguide. The light rays 1240, 1242, 1244 are deflected at angles that cause the light to propagate through the respective waveguide 1210, 1220, 1230 by TIR. The light rays 1240, 1242, 1244 propagate through the respective waveguide 1210, 1220, 1230 by TIR until impinging on the waveguide's corresponding light distributing elements 1214, 1224, 1234.

Figure 9B:
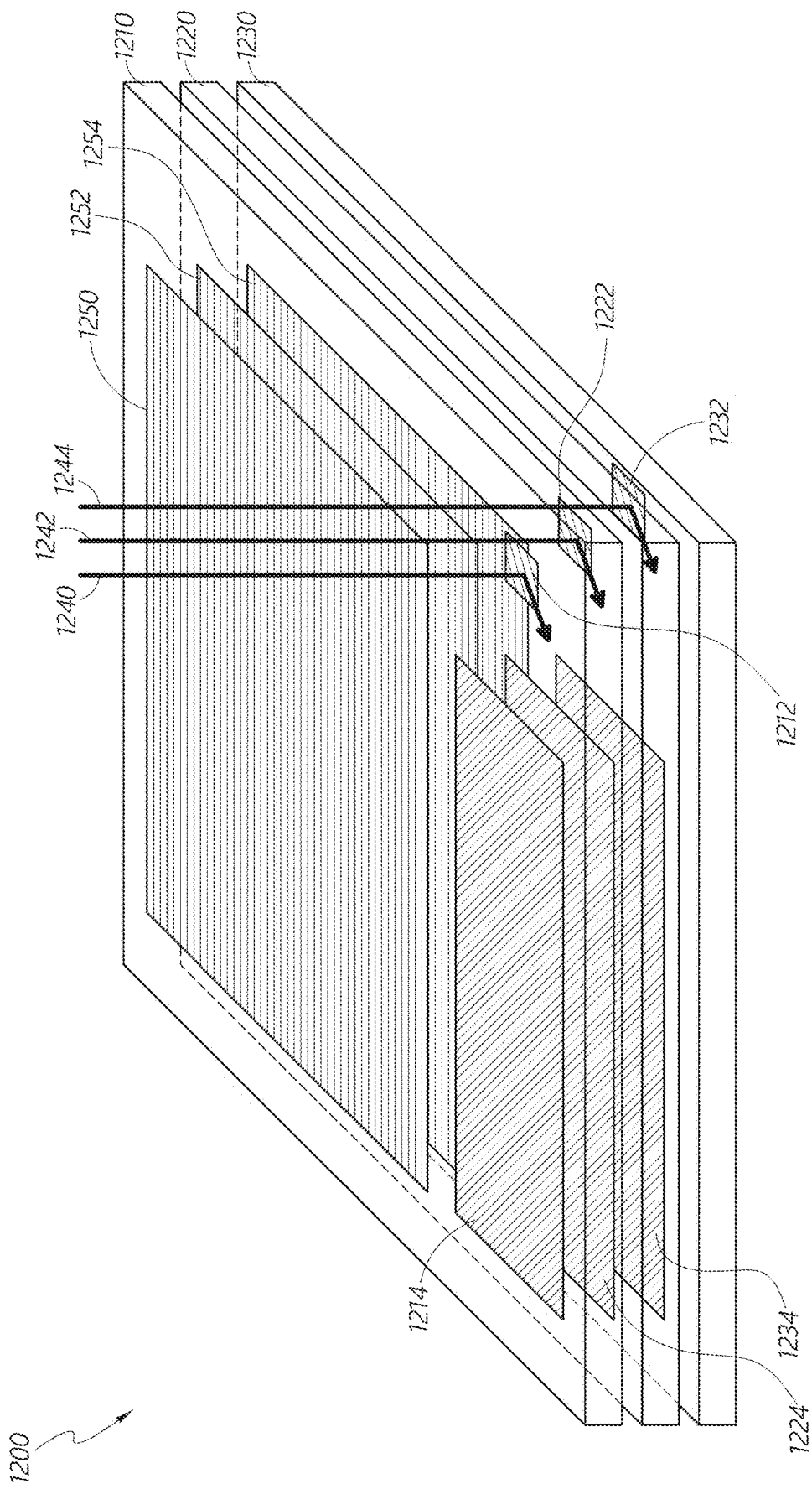
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the incoupled light rays 1240, 1242, 1244, are deflected by the incoupling optical elements 1212, 1222, 1232, respectively, and then propagate by TIR within the waveguides 1210, 1220, 1230, respectively. The light rays 1240, 1242, 1244 then impinge on the light distributing elements 1214, 1224, 1234, respectively. The light distributing elements 1214, 1224, 1234 deflect the light rays 1240, 1242, 1244 so that they propagate towards the outcoupling optical elements 1250, 1252, 1254, respectively.

In some embodiments, the light distributing elements 1214, 1224, 1234 are orthogonal pupil expanders (OPE's). In some embodiments, the OPE's both deflect or distribute light to the outcoupling optical elements 1250, 1252, 1254 and also increase the beam or spot size of this light as it propagates to the outcoupling optical elements. In some embodiments, e.g., where the beam size is already of a desired size, the light distributing elements 1214, 1224, 1234 may be omitted and the incoupling optical elements 1212, 1222, 1232 may be configured to deflect light directly to the outcoupling optical elements 1250, 1252, 1254. For example, with reference to FIG. 9A, the light distributing elements 1214, 1224, 1234 may be replaced with outcoupling optical elements 1250, 1252, 1254, respectively. In some embodiments, the outcoupling optical elements 1250, 1252, 1254 are exit pupils (EP's) or exit pupil expanders (EPE's) that direct light in a viewer's eye 4 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 1200 of waveguides includes waveguides 1210, 1220, 1230; incoupling optical elements 1212, 1222, 1232; light distributing elements (e.g., OPE's) 1214, 1224, 1234; and outcoupling optical elements (e.g., EP's) 1250, 1252, 1254 for each component color. The waveguides 1210, 1220, 1230 may be stacked with an air gap/cladding layer between each one. The incoupling optical elements 1212, 1222, 1232 redirect or deflect incident light (with different incoupling optical elements receiving light of different wavelengths) into its waveguide. The light then propagates at an angle which will result in TIR within the respective waveguide 1210, 1220, 1230. In the example shown, light ray 1242 (e.g., green light) is deflected by the first incoupling optical element 1212, and then continues to bounce down the waveguide, interacting with the light distributing element (e.g., OPE's) 1214 and then the outcoupling optical element (e.g., EPs) 1250, in a manner described earlier. The light rays 1242 and 1244 (e.g., blue and red light) will pass through the waveguide 1210, with light ray 1242 impinging on and being deflected by incoupling optical element 1222. The light ray 1242 then bounces down the waveguide 1220 via TIR, proceeding on to its light distributing element (e.g., OPEs) 1224 and then the outcoupling optical element (e.g., EP's) 1252. Finally, light ray 1244 (e.g., red light) passes through the waveguide 1220 to impinge on the light incoupling optical elements 1232 of the waveguide 1230. The light incoupling optical elements 1232 deflect the light ray 1244 such that the light ray propagates to light distributing element (e.g., OPEs) 1234 by TIR, and then to the outcoupling optical element (e.g., EPs) 1254 by TIR. The outcoupling optical element 1254 then finally outcouples the light ray 1244 to the viewer, who also receives the outcoupled light from the other waveguides 1210, 1220.

Figure 9C:
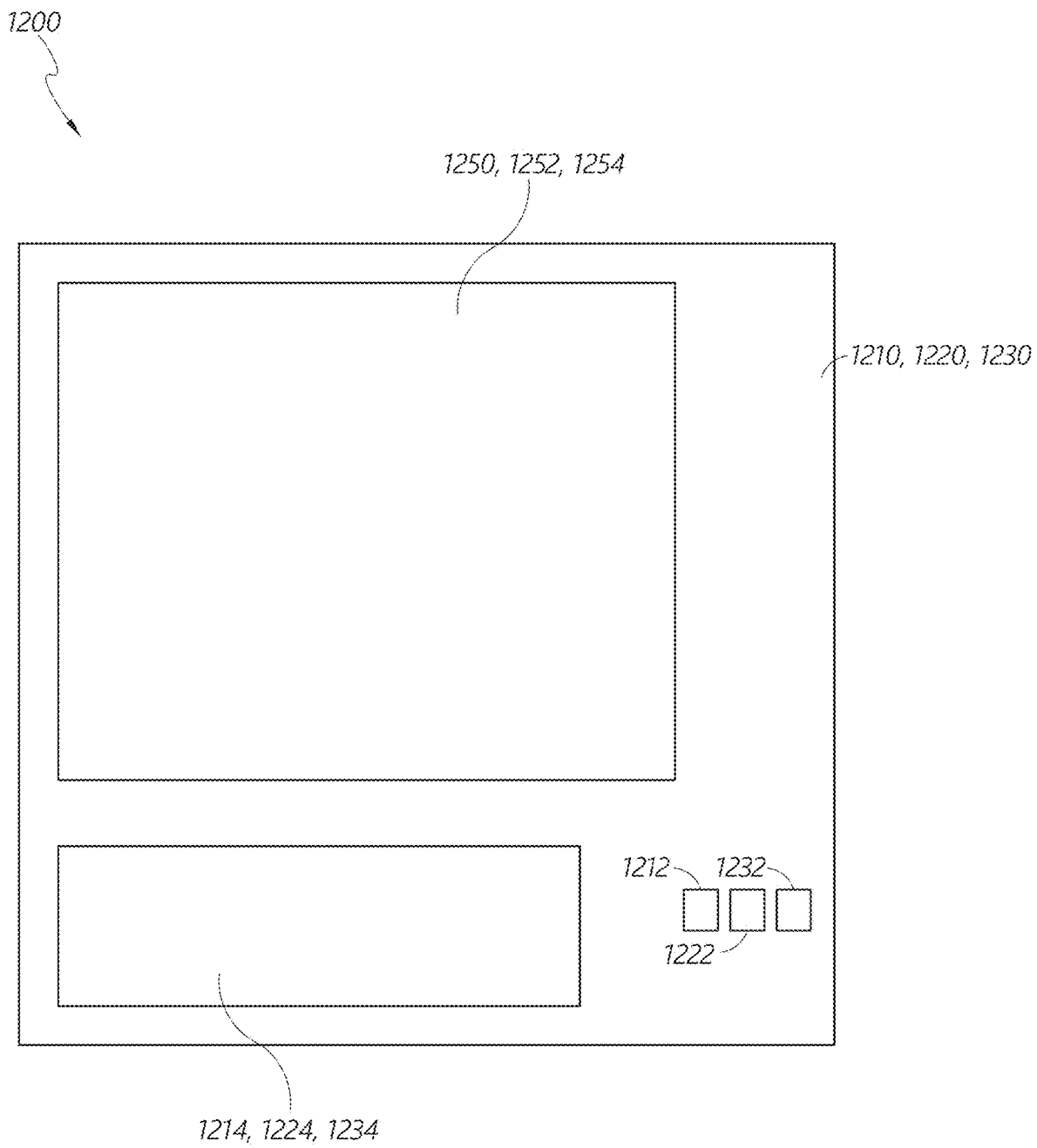
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 1210, 1220, 1230, along with each waveguide's associated light distributing element 1214, 1224, 1234 and associated outcoupling optical element 1250, 1252, 1254, may be vertically aligned. However, as discussed herein, the incoupling optical elements 1212, 1222, 1232 are not vertically aligned; rather, the incoupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Various example embodiments of the invention are described herein. Reference is made to these examples in a non-limiting sense. They are provided to illustrate more broadly applicable aspects of the invention. Various changes may be made to the invention described and equivalents may be substituted without departing from the spirit and scope of the invention.

For example, while advantageously utilized with AR displays that provide images across multiple depth planes, the augmented reality content disclosed herein may also be displayed by systems that provide images on a single depth plane.

In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events that is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

What is claimed is:

1. A polarizing beam splitter comprising:
   a solid optically transmissive spacer having first and second opposing ends, and first and second opposing faces extending therebetween, wherein the spacer has a length extending from the first to the second opposing end, and wherein the spacer comprises a material selected from the group consisting of glass and polymer;
a first polarizer on the first opposing face;
a second polarizer on the second opposing face; and
a reflection-preventing polarizer in the optically transmissive spacer and between the first and second polarizer, wherein the reflection-preventing polarizer divides the spacer into first and second sections, the first section comprising the first opposing face and the second section comprising the second opposing face, and
wherein the reflection-preventing polarizer extends only partially along the length of the spacer.

2. The polarizing beam splitter of claim 1, wherein the first polarizer and the second polarizer are configured to transmit light of a same polarization.

3. The polarizing beam splitter of claim 1, wherein the first and second opposing faces are parallel to one another and curved along a length dimension of the plate.

4. The polarizing beam splitter of claim 1, wherein the first polarizer is a polarizer selected from the group consisting of wire grid polarizers, thin film polarizers, and multilayer birefringent stack polarizers.

5. The polarizing beam splitter of claim 4, wherein the second polarizer is a polarizer selected from the group consisting of wire grid polarizers, thin film polarizers, and multilayer birefringent stack polarizers.

6. The polarizing beam splitter of claim 5, wherein the first and the second polarizers are a same type of polarizer.

7. The polarizing beam splitter of claim 1, wherein the reflection-preventing polarizer is an absorptive polarizer.

8. The polarizing beam splitter of claim 7, wherein the absorptive polarizer extends parallel to the first and second opposing faces.

9. A display system comprising:
a polarizing beam splitter comprising:
  a solid optically transmissive spacer having first and second opposing ends, and first and second opposing faces extending therebetween, wherein the spacer has a length extending from the first to the second opposing end, and wherein the spacer comprises a material selected from the group consisting of glass and polymer;
  a first polarizer on the first opposing face;
  a second polarizer on the second opposing face; and
  a reflection-preventing polarizer in the optically transmissive spacer and between the first and second polarizer, wherein the reflection-preventing polarizer divides the spacer into first and second sections, the first section comprising the first opposing face and the second section comprising the second opposing face, and wherein the reflection-preventing polarizer extends only partially along the length of the spacer;
a light source;
a spatial light modulator; and
a reflector,
wherein the polarizing beam splitter is configured to:
  reflect light from the light source towards the reflector;
  transmit light from the reflector to the spatial light modulator; and
  reflect light from the spatial light modulator such that the light propagates away from the polarizing beam splitter and the light source.

10. The display system of claim 9, wherein the reflector and the spatial light modulator are on opposite sides of the polarizing beam splitter, and wherein the light source is positioned to output light to the polarizing beam splitter in a direction orthogonal to an optical path extending from the reflector to the spatial light modulator.

11. The display system of claim 10, further comprising a refractive optic configured to receive the light propagating away from the polarizing beam splitter and the light source, and to transmit the light towards a viewer.

12. The display system of claim 10, further comprising a waveguide comprising:
incoupling optical elements configured to redirect incident light into the waveguide for propagation within the waveguide by total internal reflection; and
outcoupling diffractive optical elements,
wherein the incoupling optical elements are configured to receive and incouple the light propagating away from the beam splitter and the light source, and
wherein the outcoupling diffractive optical elements are configured to outcouple the incoupled light out of the waveguide and towards a viewer.

13. The display system of claim 12, further comprising a stack of the waveguides.

14. The display system of claim 13, wherein the outcoupling optical elements of each waveguide of the stack is configured to output light with different amounts of divergence in comparison to the outcoupling optical elements of one or more other waveguides of the stack of waveguides.

15. The display system of claim 9, wherein the reflection-preventing polarizer is an absorptive polarizer.

16. The display system of claim 15, wherein the absorptive polarizer extends parallel to the first and second opposing faces.

17. The display system of claim 9, wherein the first and second opposing faces are parallel to one another and curved along a length dimension of the plate.

18. The display system of claim 9, wherein the first polarizer is a polarizer selected from the group consisting of wire grid polarizers, thin film polarizers, and multilayer birefringent stack polarizers.

19. The display system of claim 18, wherein the second polarizer is a polarizer selected from the group consisting of wire grid polarizers, thin film polarizers, and multilayer birefringent stack polarizers.

* * * * *